(12) United States Patent
Inagaki et al.

(10) Patent No.: US 11,795,072 B2
(45) Date of Patent: Oct. 24, 2023

(54) ELECTROLYZED WATER GENERATOR AND ELECTROLYZED WATER GENERATION SYSTEM

(71) Applicant: PANASONIC INTELLECTUAL PROPERTY MANAGEMENT CO., LTD., Osaka (JP)

(72) Inventors: Kenichiro Inagaki, Shiga (JP); Shunsuke Mori, Osaka (JP); Minoru Nagata, Shiga (JP); Mami Kuroda, Kyoto (JP); Tetsuya Maekawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 8 days.

(21) Appl. No.: 17/047,869

(22) PCT Filed: May 15, 2019

(86) PCT No.: PCT/JP2019/019203
§ 371 (c)(1),
(2) Date: Oct. 15, 2020

(87) PCT Pub. No.: WO2019/225414
PCT Pub. Date: Nov. 28, 2019

(65) Prior Publication Data
US 2021/0155509 A1    May 27, 2021

(30) Foreign Application Priority Data

May 25, 2018  (JP) ................................ 2018-100662
May 25, 2018  (JP) ................................ 2018-100672
May 25, 2018  (JP) ................................ 2018-100683

(51) Int. Cl.
*C02F 1/461* (2023.01)
*C02F 1/467* (2023.01)

(52) U.S. Cl.
CPC ........ *C02F 1/46109* (2013.01); *C02F 1/4672* (2013.01); *C02F 1/46104* (2013.01);
(Continued)

(58) Field of Classification Search
CPC ...... C02F 1/46109; C02F 1/4618; C02F 1/46; C25B 1/04
See application file for complete search history.

(56) References Cited

U.S. PATENT DOCUMENTS 4,136,005 A * 1/1979 Persson ................. C02F 1/4674
204/266
4,561,946 A * 12/1985 Suhara ...................... C25B 1/46
204/252

(Continued)

FOREIGN PATENT DOCUMENTS

JP          9-070580 A       3/1997
JP        H10-202260 A       8/1998
(Continued)

OTHER PUBLICATIONS

International Search Report and Written Opinion dated Jul. 30, 2019 in International Patent Application No. PCT/JP2019/019203; with partial English translation.
(Continued)

*Primary Examiner* — Harry D Wilkins, III
(74) *Attorney, Agent, or Firm* — McDermott Will & Emery LLP

(57) ABSTRACT

An electrolyzed water generator includes anode, cathode, and cation exchange membrane provided between anode and cathode so as to be in contact with at least one of anode and cathode. Gaps in which a flow of water occurs are present
(Continued)

between cation exchange membrane and at least one of anode and cathode.

10 Claims, 13 Drawing Sheets

(52) U.S. Cl.
CPC .............. *C02F 2001/46133* (2013.01); *C02F 2201/4611* (2013.01); *C02F 2201/46115* (2013.01)

(56) References Cited

U.S. PATENT DOCUMENTS

| | | | |
|---|---|---|---|
| 4,608,144 A * | 8/1986 | Darwent | .................. C25B 9/70 204/263 |
| 5,114,547 A * | 5/1992 | Ullman | ..................... C25C 7/02 204/252 |
| 2001/0022273 A1 | 9/2001 | Popov et al. | |
| 2009/0008268 A1 * | 1/2009 | Salathe | ................. C02F 1/4674 205/746 |
| 2012/0168302 A1 | 7/2012 | Kato et al. | |
| 2016/0200573 A1 | 7/2016 | Yokota et al. | |
| 2018/0037480 A1 | 2/2018 | Kurokawa et al. | |
| 2019/0055144 A1 | 2/2019 | Inagaki et al. | |

FOREIGN PATENT DOCUMENTS

| | | |
|---|---|---|
| JP | 2000-263046 A | 9/2000 |
| JP | 2004-188398 A | 7/2004 |
| JP | 2011-136333 A | 7/2011 |
| JP | 2012-041572 A | 3/2012 |
| JP | 2014-217820 A | 11/2014 |
| JP | 2018-020279 A | 2/2018 |
| KR | 10-2018-027407 A | 3/2018 |
| WO | 2011/070926 A1 | 6/2011 |
| WO | 2011/150473 A1 | 12/2011 |
| WO | 2015/141329 A1 | 9/2015 |
| WO | 2017/010372 A1 | 1/2017 |
| WO | 2017/168475 A1 | 10/2017 |

OTHER PUBLICATIONS

The Extended European Search Report dated Jul. 29, 2021 for the related European Patent Application No. 19806397.6.
Indian Examination Report dated Mar. 21, 2022 for the related Indian Patent Application No. 202047050112.

* cited by examiner

ELECTROLYZED WATER GENERATOR AND ELECTROLYZED WATER GENERATION SYSTEM

CROSS-REFERENCE OF RELATED APPLICATIONS

This application is the U.S. National Phase under 35 U.S.C. § 371 of International Patent Application No. PCT/JP2019/019203, filed on May 15, 2019, which in turn claims the benefit of Japanese Application No. 2018-100662, filed on May 25, 2018, Japanese Application No. 2018-100672, filed on May 25, 2018, and Japanese Application No. 2018-100683, filed on May 25, 2018, the entire disclosures of which Applications are incorporated by reference herein.

TECHNICAL FIELD

The present disclosure relates to an electrolyzed water generator and an electrolyzed water generation system.

BACKGROUND ART

Conventionally, an electrolyzed water generation system has been developed. A conventional electrolyzed water generation system includes a flow path through which water flows and an electrolyzed water generator connected to the flow path. The electrolyzed water generator includes an anode, a cathode, and a cation exchange membrane provided between the anode and the cathode. The electrolyzed water generator is controlled by a controller to be switched to either a generation state where electrolyzed water is generated from water flowing through the flow path or a non-generation state where electrolyzed water is not generated.

CITATION LIST

Patent Literature

PTL 1: Unexamined Japanese Patent Publication No. 2011-136333

SUMMARY OF THE INVENTION

In some of the above-described conventional electrolyzed water generators, the anode and the cation exchange membrane are provided in contact with each other, and the cation exchange membrane and the cathode are provided in contact with each other. In such a conventional electrolyzed water generator, the cation exchange membrane is a non-woven fabric. Thus, a gap (whose details are too small to show) closed to the extent that water does not flow may be present at least one of between the anode and the cation exchange membrane and between the cation exchange membrane and the cathode.

In this case, gas generated near the anode, for example, oxygen or ozone may be retained in the gap provided between the anode and the cation exchange membrane and closed to the extent that water does not flow. On the other hand, gas generated near the cathode, for example, hydrogen may be retained in the gap provided between the cation exchange membrane and the cathode and closed to the extent that water does not flow. In these cases, the gas retained between the anode and the cation exchange membrane and between the cation exchange membrane and the cathode functions as an insulator between the anode and the cathode. Thus, when a voltage applied between the anode and the cathode is maintained at a constant value, the concentration of electrolyzed water gradually decreases. Therefore, in order to continue to use electrolyzed water of a desired concentration, it is necessary to progressively increase the voltage applied between the anode and the cathode lager than a predetermined reference voltage.

The present disclosure has been made focusing on the above-mentioned conventional problems. An object of the present disclosure is to provide an electrolyzed water generator and an electrolyzed water generation system that reduce a degree to which a voltage applied between an anode and a cathode is made higher than a reference voltage in order to continue to use a desired concentration of electrolyzed water.

The electrolyzed water generator of the present disclosure includes an anode, a cathode, and a cation exchange membrane provided between the anode and the cathode so as to be in contact with at least one of the anode and the cathode. A gap in which a flow of water occurs is present between the cation exchange membrane and at least one of the anode and the cathode.

In the electrolyzed water generator of the present disclosure, the cation exchange membrane is provided in contact with the anode and the cathode. The cation exchange membrane is provided with a membrane hole penetrating the cation exchange membrane such that a surface of the anode facing the cation exchange membrane is exposed. The cathode is provided with a cathode hole penetrating the cathode so as to communicate with the membrane hole. The cathode hole of the cathode is provided with a high electrical resistance material having an electrical resistance value higher than an electrical resistance value of the cathode.

The electrolyzed water generator of the present disclosure includes an anode, a cation exchange membrane provided in contact with the anode, a cathode provided in contact with the cation exchange membrane and having a frame shape, and a high electrical resistance material provided on an inner periphery of the frame shape so as to be in contact with an inner peripheral surface of the frame shape and having an electrical resistance value higher than an electrical resistance value of the cathode. The cation exchange membrane is provided with a membrane hole penetrating the cation exchange membrane such that a surface of the anode facing the cation exchange membrane is exposed. The high electrical resistance material is provided with a communication hole penetrating the high electrical resistance material such that the high electrical resistance material communicates with the membrane hole.

The electrolyzed water generation system of the present disclosure includes an electrolyzed water generator and a controller that controls the electrolyzed water generator. The controller intermittently applies a voltage between the anode and the cathode.

The electrolyzed water generation system of the present disclosure includes a trunk flow path supplied with water, a first branch flow path branched from the trunk flow path, an electrolyzed water generator that includes an anode, a cathode, and a cation exchange membrane provided between the anode and the cathode, the electrolyzed water generator being connected to the first branch flow path, and switched between a generation state where electrolyzed water is generated from water flowing through the first branch flow path and a non-generation state where the electrolyzed water is not generated, a second branch flow path that is branched from the trunk flow path and supplies the water, flowing through the trunk flow path, to a downstream of the trunk flow path, and a flow path change mechanism that is switched between a first state where the water is supplied from the trunk flow path to the first branch flow path and a second state where the water is supplied from the trunk flow path to the second branch flow path.

According to the electrolyzed water generator and the electrolyzed water generation system of the present disclosure, it is possible to reduce a degree to which a voltage applied between the anode and the cathode is made higher than a reference voltage in order to continue to use a desired concentration of electrolyzed water.

DESCRIPTION OF EMBODIMENTS

Figure 1:
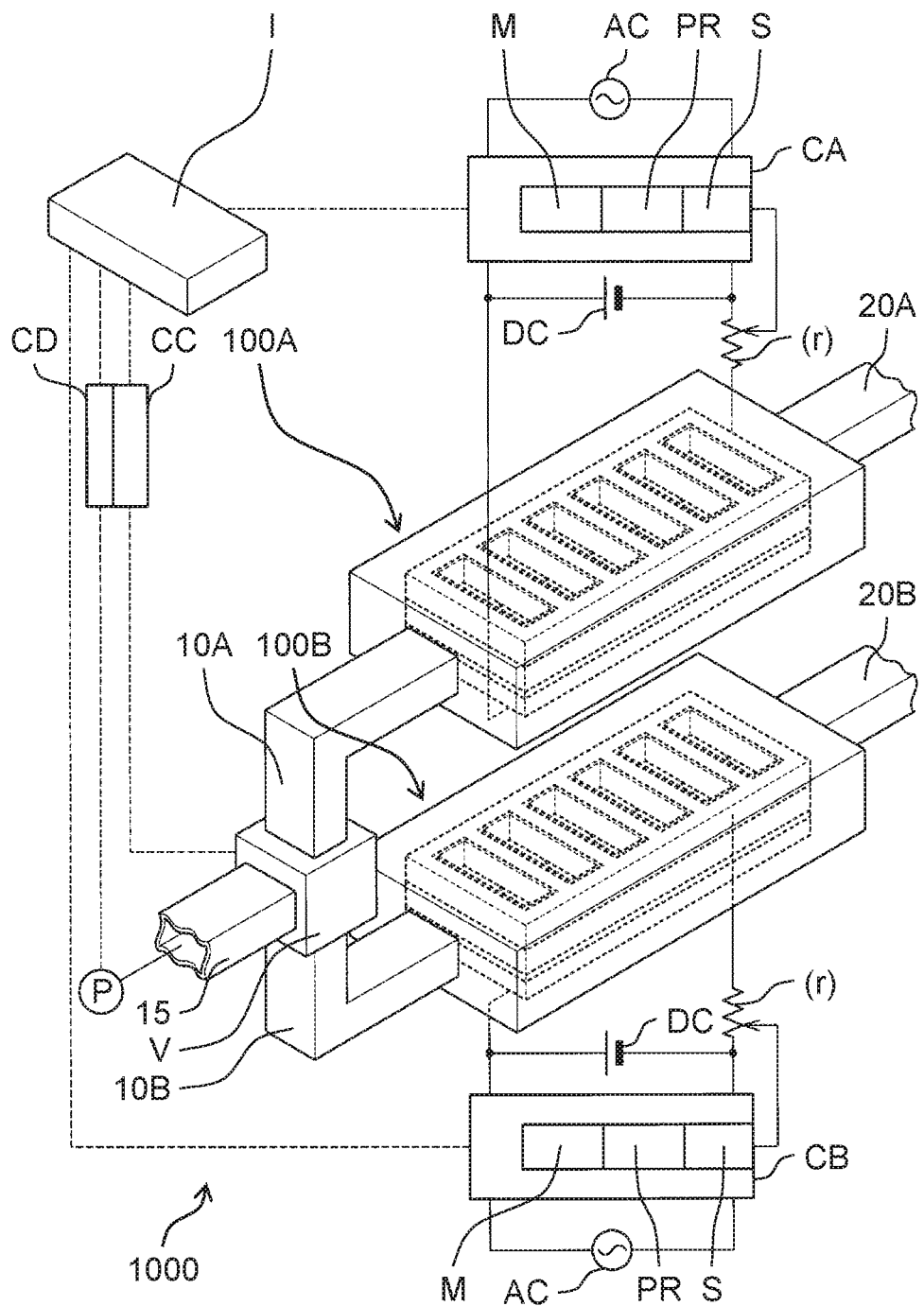
FIG. 1 is an external perspective view of an electrolyzed water generation system of a first exemplary embodiment.

Hereinafter, an electrolyzed water generation system and an electrolyzed water generator used therein of each exemplary embodiment will be described with reference to the drawings. In the following exemplary embodiments, portions having the same reference numerals have the same function as each other even if there is a slight difference in shape in the drawings, unless otherwise specified.

First Exemplary Embodiment

Electrolyzed water generation system 1000 of a first exemplary embodiment will be described with reference to FIGS. 1 to 9.

(Structure of System)

As shown in FIG. 1, electrolyzed water generation system 1000 includes a flow path through which water flows. The flow path provided in electrolyzed water generation system 1000 includes trunk flow path 15, upstream-side first branch flow path 10A, downstream-side first branch flow path 20A, upstream-side second branch flow path 10B, and downstream-side second branch flow path 20B. Trunk flow path 15 receives water delivered by pump P. That is, the water is supplied from pump P to trunk flow path 15. Upstream-side first branch flow path 10A and upstream-side second branch flow path 10B are branched from trunk flow path 15, respectively. In the present exemplary embodiment, the water supplied from pump P is also referred to as raw water.

First branch flow paths 10A and 20A include upstream-side first branch flow path 10A and downstream-side first branch flow path 20A. First electrolyzed water generator 100A is connected between upstream-side first branch flow path 10A and downstream-side first branch flow path 20A.

Second branch flow paths 10B and 20B include upstream-side second branch flow path 10B and downstream-side second branch flow path 20B. Second electrolyzed water generator 100B is connected between upstream-side second branch flow path 10B and downstream-side second branch flow path 20B.

Trunk flow path 15, upstream-side first branch flow path 10A, downstream-side first branch flow path 20A, upstream-side second branch flow path 10B, and downstream-side second branch flow path 20B are each a hollow rectangular tube made of acrylic resin.

Electrolyzed water generation system 1000 is a branch portion between trunk flow path 15 and upstream-side first branch flow path 10A, and at a branch portion between trunk flow path 15 and upstream-side second branch flow path 10B, flow path change mechanism V is provided. In the present exemplary embodiment, flow path change mechanism V is a three-way valve that functions as a flow path switching valve. In electrolyzed water generation system 1000 of the present exemplary embodiment, the raw water flowing through trunk flow path 15 passes through flow path change mechanism V and flows into (is supplied to) any one of upstream-side first branch flow path 10A and upstream-side second branch flow path 10B.

The raw water that has flowed into upstream-side first branch flow path 10A flows into first electrolyzed water generator 100A. The raw water that has flowed into first electrolyzed water generator 100A changes into electrolyzed water when passing through first electrolyzed water generator 100A, and flows into downstream-side first branch flow path 20A.

The raw water that has flowed into upstream-side second branch flow path 10B flows into second electrolyzed water generator 100B. The raw water that has flowed into second electrolyzed water generator 100B changes into electrolyzed water when passing through second electrolyzed water generator 100B, and flows into downstream-side second branch flow path 20B.

(Controller)

As shown in FIG. 1, electrolyzed water generation system 1000 includes controllers CA, CB, CC, and CD. Controller CA controls first electrolyzed water generator 100A. Controller CB controls second electrolyzed water generator 100B. Controller CC controls flow path change mechanism V. Controller CD controls pump P. In the present exemplary embodiment, controllers CA, CB, CC, and CD are drawn as separate parts. However, controllers CA, CB, CC, and CD may be a single controller that is formed of a single integrally formed part.

Electrolyzed water generation system 1000 includes input unit I operated by an operator. Input unit I transmits a command signal to each of controllers CA, CB, CC, and CD based on the operation of the operator. Controller CA and controller CB each has sensor S, memory M, processor PR, and the like. In controllers CA and CB, processor PR uses a program stored in memory M to generate DC power DC from AC power AC. As a result, controller CA applies a DC voltage to anode 1A (see FIG. 2) and cathode 1C (see FIG. 2) in first electrolyzed water generator 100A. Controller CB applies a DC voltage to anode 1A (see FIG. 2) and cathode 1C (see FIG. 2) in second electrolyzed water generator 100B. Although not shown, controller CC and controller CD each has a sensor, a memory, a processor and the like.

Controllers CA and CB each receive a current, flowing between anode 1A and cathode 1C, through resistor (r). Consequently, controllers CA, CB each control a value of the voltage applied between anode 1A and cathode 1C based on information of a value of the current flowing between anode 1A and cathode 1C, the value being detected by sensor S. Specifically, controllers CA, CB each control the value of the voltage applied between anode 1A and cathode 1C such that the value of the current flowing between anode 1A and cathode 1C becomes a predetermined value.

The concentration of electrolyzed water, for example, the concentration of ozone water, is estimated to be proportional to the value of the current flowing between anode 1A and cathode 1C. Therefore, in order to maintain the concentration of usable electrolyzed water at a constant value (including a substantially constant value), controllers CA, CB each change the voltage applied between anode 1A and cathode 1C such that the value of the current flowing between anode 1A and cathode 1C is maintained at an almost constant value.

For example, if first electrolyzed water generator 100A continues to be used, the value of the current detected by sensor S of controller CA may be lower than a predetermined value. In this case, controller CA that continues to be used executes a control for increasing the value of the voltage applied between anode 1A and cathode 1C such that the value of the current flowing between anode 1A and cathode 1C in first electrolyzed water generator 100A increases to a predetermined value.

For example, if second electrolyzed water generator 100B continues to be used, the value of the current detected by sensor S of controller CB may be lower than a predetermined value. In this case, controller CB that continues to be used executes a control for increasing the value of the voltage applied between anode 1A and cathode 1C such that the value of the current flowing between anode 1A and cathode 1C in second electrolyzed water generator 100B increases to a predetermined value.

Controller CA controls first electrolyzed water generator 100A based on the command signal received from input unit I. Controller CB controls second electrolyzed water generator 100B based on the command signal received from input unit I. Controller CC controls flow path change mechanism V based on the command signal received from input unit I. Controller CD controls pump P based on the command signal received from input unit I.

In controllers CA, CB, CC, and CD, when at least one of first electrolyzed water generator 100A and second electrolyzed water generator 100B is filled with water, or when an abnormal situation such as electrical connection occurs in electrolyzed water generation system 1000, first electrolyzed water generator 100A and second electrolyzed water generator 100B are stopped. Controllers CA, CB, CC, and CD perform the subsequent usual processing unless such an abnormal situation occurs.

(Flow Path Change Mechanism)

Flow path change mechanism V shown in FIG. 1 is controlled by controller CC to selectively form one of a first state where raw water is guided from trunk flow path 15 to upstream-side first branch flow path 10A and a second state where the raw water is guided from trunk flow path 15 to upstream-side second branch flow path 10B. That is, flow path change mechanism V is switched between the first state and the second state. Although flow path change mechanism V is one three-way valve, that is, a flow path switching valve in the present exemplary embodiment, flow path change mechanism V may be two open/close valves provided in upstream-side first branch flow path 10A and upstream-side second branch flow path 10B, respectively. In this case, controller CC controls opening/closing operation of the two switching valves such that the opening/closing operation of the two open/close valves becomes the same as flow path switching operation of the flow path switching valve.

(Structure of Electrolyzed Water Generator)

First electrolyzed water generator 100A and second electrolyzed water generator 100B of the first exemplary embodiment shown in FIG. 2 will be described. First electrolyzed water generator 100A and second electrolyzed water generator 100B are both shown as an example of a plurality of electrolyzed water generators. Therefore, any one of the three or more electrolyzed water generators may be selectively and sequentially controlled to a generation state where electrolyzed water is generated.

First electrolyzed water generator 100A and second electrolyzed water generator 100B both function as an ozone water generator that generates ozone water as electrolyzed water. In the present exemplary embodiment, first electrolyzed water generator 100A and second electrolyzed water generator 100B have the same structure. However, first electrolyzed water generator 100A and second electrolyzed water generator 100B may have different structures from each other.

First electrolyzed water generator 100A and second electrolyzed water generator 100B both include housing 101 and layered structure 1 provided in housing 101. Housing 101 has electrode case 102 and electrode case lid 103 that closes an opening above electrode case 102.

(Electrode Case)

Figure 2:
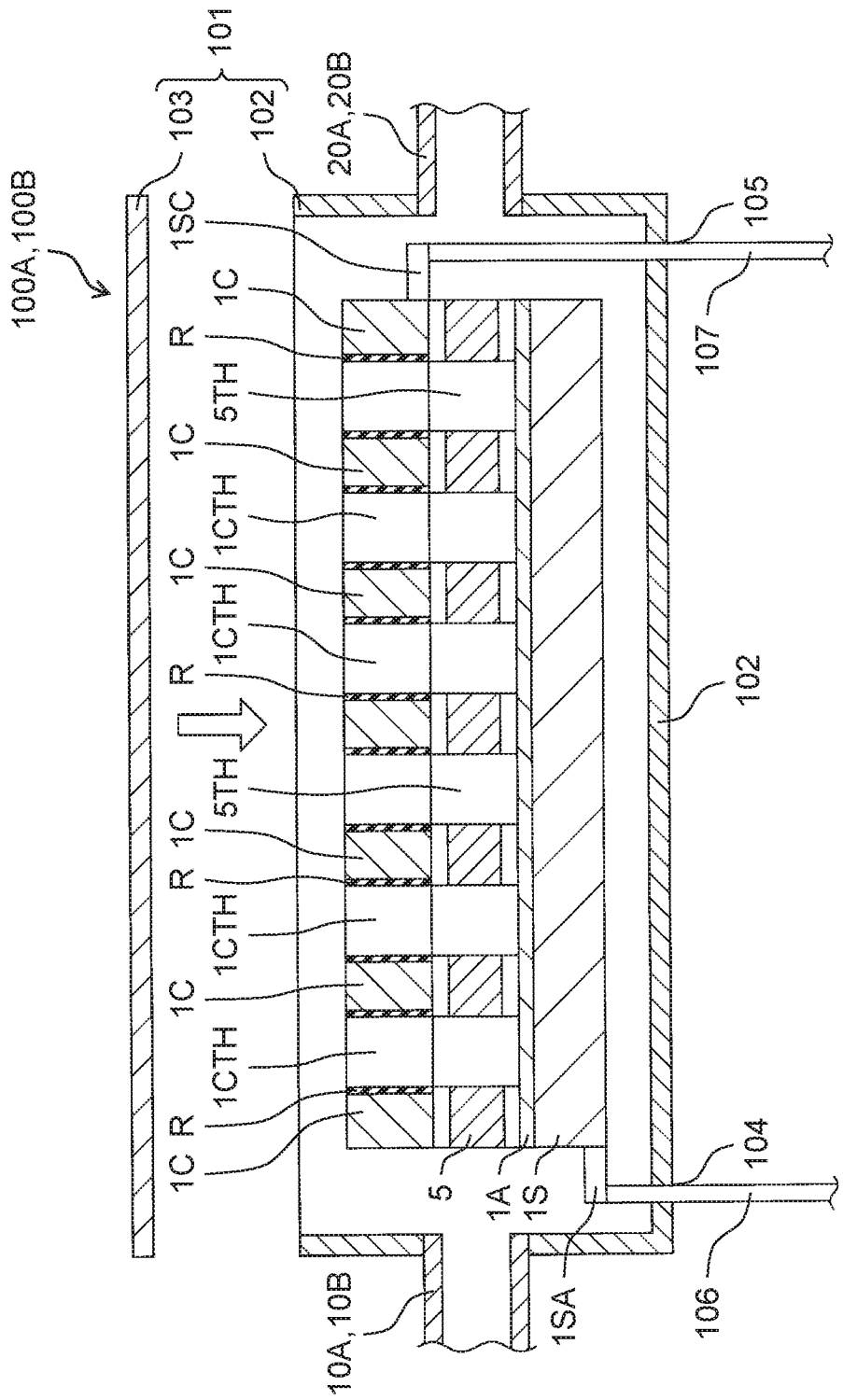
FIG. 2 is a longitudinal sectional view of an electrolyzed water generator of the first exemplary embodiment.

As shown in FIG. 2, electrode case 102 of first electrolyzed water generator 100A and electrode case 102 of second electrolyzed water generator 100B have the same structure. Electrode case 102 is made of acrylic resin, for example. Electrode case 102 has a container structure having an open top surface.

Upstream-side first branch flow path 10A is connected to a side surface on one end side of electrode case 102 of first electrolyzed water generator 100A. Downstream-side first branch flow path 20A is connected to a side surface on the other end side facing the side surface on one end side of electrode case 102 of first electrolyzed water generator 100A. Upstream-side second branch flow path 10B is connected to a side surface on one end side of electrode case 102 of second electrolyzed water generator 100B. Downstream-side second branch flow path 20B is connected to a side surface on the other end side facing the side surface on one end side of electrode case 102 of second electrolyzed water generator 100B. Electrode case 102 has in its inside a rib (not shown) that supports layered structure 1.

A bottom surface of electrode case 102 has two through-holes 104, 105. Power supply shafts 106, 107 extend to the outside of electrode case 102 via two through-holes 104, 105, respectively. Wirings (not shown) extending from tips of power supply shafts 106, 107 of first electrolyzed water generator 100A are electrically connected to controller CA. Wirings extending from power supply shafts 106, 107 of second electrolyzed water generator 100B are electrically connected to controller CB.

(Layered Structure)

Figure 3:
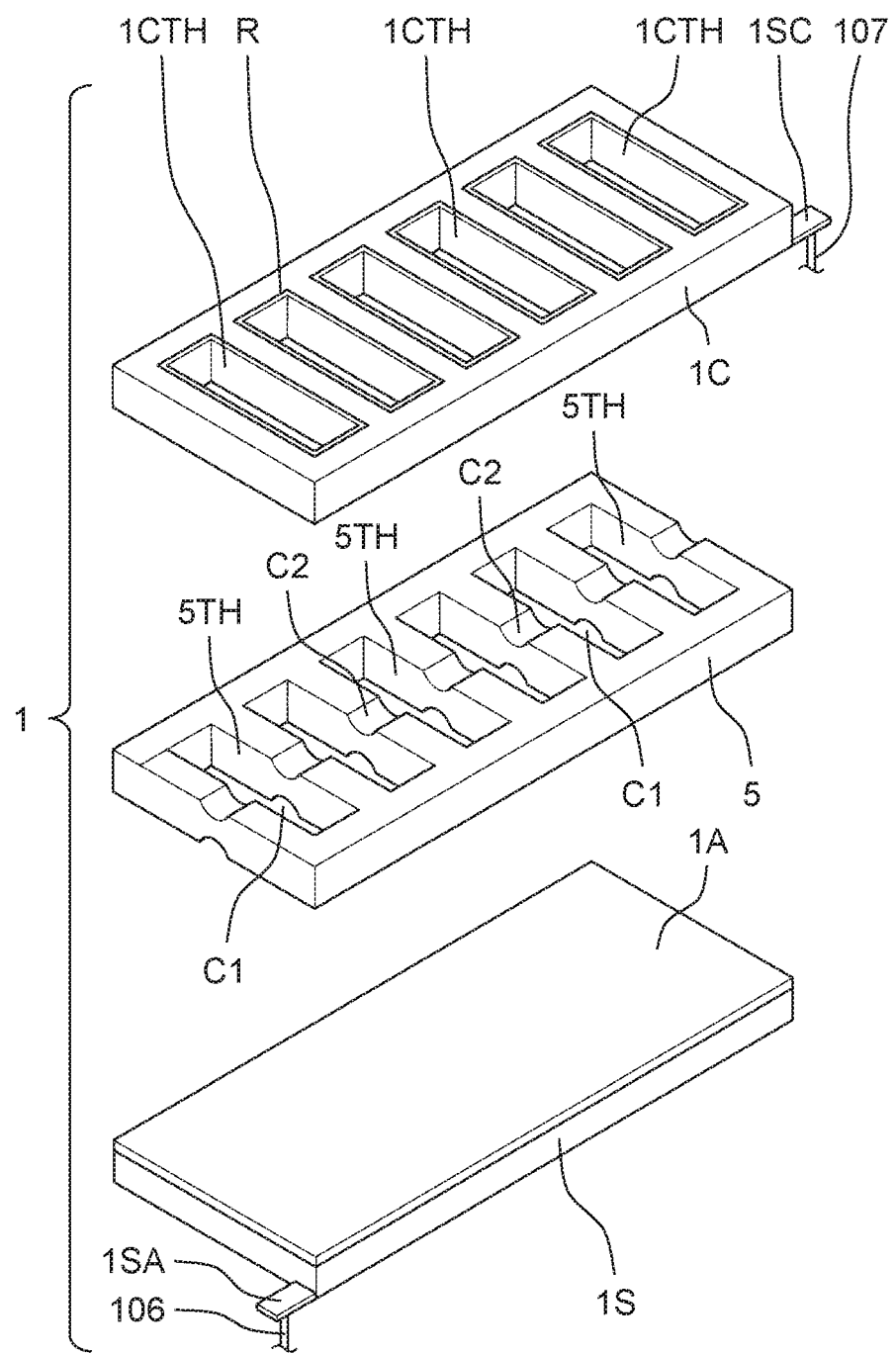
FIG. 3 is an exploded perspective view of a layered structure of the electrolyzed water generator of the first exemplary embodiment.

As shown in FIGS. 2 and 3, first electrolyzed water generator 100A and second electrolyzed water generator 100B each contain identical layered structure 1. Layered structure 1 includes power supply body 1S, anode 1A, cation exchange membrane 5, and cathode 1C. Anode 1A is formed on one main surface of power supply body 1S by a plasma CVD (Chemical Vapor Deposition) method. Cation exchange membrane 5 is stacked on anode 1A, that is, on a surface of one end of anode 1A. Cathode 1C is stacked on cation exchange membrane 5, that is, on a surface of cation exchange membrane 5 opposite to a surface on which anode 1A is stacked.

As shown in FIG. 2, upstream-side first branch flow path 10A is connected to an inlet port on the upstream side of first electrolyzed water generator 100A. Downstream-side first branch flow path 20A is connected to an outlet port on the downstream side of first electrolyzed water generator 100A. First electrolyzed water generator 100A is switched to either a first generation state where first electrolyzed water is generated from raw water flowing through upstream-side first branch flow path 10A or a first non-generation state where the first electrolyzed water is not generated. That is, first electrolyzed water generator 100A is switched between the first generation state and the first non-generation state.

As shown in FIG. 2, upstream-side second branch flow path 10B is connected to an inlet port on the upstream side of second electrolyzed water generator 100B. Downstream-side second branch flow path 20B is connected to an outlet port on the downstream side of second electrolyzed water generator 100B. Second electrolyzed water generator 100B is switched to either a second generation state where second electrolyzed water is generated from raw water flowing through second branch flow path 10B or a second non-generation state where the second electrolyzed water is not generated. That is, second electrolyzed water generator 100B is switched between the second generation state and the second non-generation state.

Layered structure 1 electrolyzes raw water to generate ozone water as electrolyzed water. Layered structure 1 has, for example, a thin plate shape having a size of 10 mm×50 mm×1.2 mm. Layered structure 1 has a hole portion, more specifically, a groove or a slit. As will be described in detail later, the hole portion penetrates cathode 1C and cation exchange membrane 5 and is configured such that an upper surface (front surface) of anode 1A, that is, a surface of anode 1A facing cation exchange membrane 5 is exposed on a penetrated bottom surface.

As may be inferred from the cross-sectional view of FIG. 2, cathode 1C and cation exchange membrane 5 are arranged such that a slit as cathode hole 1CTH of cathode 1C and a slit as membrane hole 5TH of cation exchange membrane 5 overlap each other in plan view. Thus, the above-mentioned hole portion of layered structure 1 communicates from the flow path above cathode 1C to the upper surface of anode 1A.

In each of first electrolyzed water generator 100A and second electrolyzed water generator 100B of the present exemplary embodiment, anode 1A and cation exchange membrane 5 are arranged so as to be in contact with each other. Cation exchange membrane 5 and cathode 1C are arranged in contact with each other. In other words, cation exchange membrane 5 is provided between anode 1A and cathode 1C so as to be in contact with anode 1A, and cation exchange membrane 5 is provided between anode 1A and cathode 1C so as to be in contact with cathode 1C. However, anode 1A and cation exchange membrane 5 may be spaced from each other. Cation exchange membrane 5 and cathode 1C may be provided to be spaced from each other.

(Power Supply Body)

Power supply body 1S shown in FIGS. 2 and 3 imparts a positive charge to anode 1A of layered structure 1. Power supply body 1S has, for example, a thin plate shape having a size of 10 mm×50 mm×0.5 mm. Shaft attachment piece 1SA is configured by an extending portion of one edge of power supply body 1S. Power supply body 1S may be, for example, a boron-doped conductive diamond material or titanium. Power supply body 1S is supported by electrode case 102. Power supply shaft 106 pulled out from shaft attachment piece 1SA is electrically connected to controller CA or controller CB.

(Anode)

Anode 1A shown in FIGS. 2 and 3 receives positive charges from controllers CA, CB, that is, the positive charge imparted from power supply body 1 to generate ozone bubbles as electrolyzed water. Anode 1A has, for example, a thin plate shape having a size of 10 mm×50 mm×3 sm. Anode 1A is, for example, a boron-doped conductive diamond film.

(Cation Exchange Membrane)

Cation exchange membrane 5 shown in FIGS. 2 and 3 is held in a state of being sandwiched between anode 1A and cathode 1C. Positive charges imparted from power supply body 15 move from anode 1A to cathode 1C. Cation exchange membrane 5 has, for example, a thin plate shape having a size of 10 mm×50 mm×0.2 mm. Cation exchange membrane 5 has slit-shaped membrane hole 5TH penetrating from an upper surface of cation exchange membrane 5 to a lower surface of cation exchange membrane 5 toward anode 1A. In other words, membrane hole 5TH penetrates cation exchange membrane 5 such that the surface of anode 1A facing cation exchange membrane 5 is exposed.

A longitudinal direction of slit-shaped membrane hole 5TH is a direction orthogonal to a longitudinal direction of cathode 1C. The dimensions of slit-shaped membrane hole 5TH are, for example, 7 mm×1 mm×0.5 mm. Differing from the view, membrane holes 5TH are provided at ten positions on cation exchange membrane 5, for example. Cation exchange membrane 5 is provided with a groove or a cutout that forms gap C1 or gap C2 that connects (communicates) adjacent membrane holes 5TH to each other. That is, gap C1 and gap C2 are connected to membrane hole 5TH. The groove or cutout may be a recess that is necessarily formed during the manufacturing process.

(Cathode)

Cathode 1C shown in FIG. 2 and FIG. 3 receives a positive charge that has passed through cation exchange membrane 5 and generates hydrogen bubbles. Cathode 1C has, for example, a thin plate shape having a size of 10 mm×50 mm×0.5 mm. Shaft attachment piece 1SC is configured by an extending portion of one edge of cathode 1C. Cathode 1C has slit-shaped cathode hole 1CTH penetrating from an upper surface of cathode 1C to a lower surface of cathode 1C. Cathode hole 1CTH penetrates cathode 1C so as to communicate with membrane hole 5TH.

A longitudinal direction of slit-shaped cathode hole 1CTH is a direction orthogonal to the longitudinal direction of cathode 1C. The dimensions of slit-shaped cathode hole 1CTH are, for example, 7 mm×1 mm×0.5 mm. Differing from the view, cathode holes 1CTH are provided at ten positions on cation 1C, for example. High electrical resistance material R which is a resin coating material is applied to an inner peripheral surface of cathode hole 1CTH. An electrical resistance value of high electrical resistance material R is larger (higher) than the electrical resistance value of cathode 1C. Cathode 1C is made of stainless steel, for example. Power supply shaft 107 pulled out from shaft attachment piece 1SC of cathode 1C is electrically connected to controller CA or controller CB.

(Chemical Action)

Figure 4:
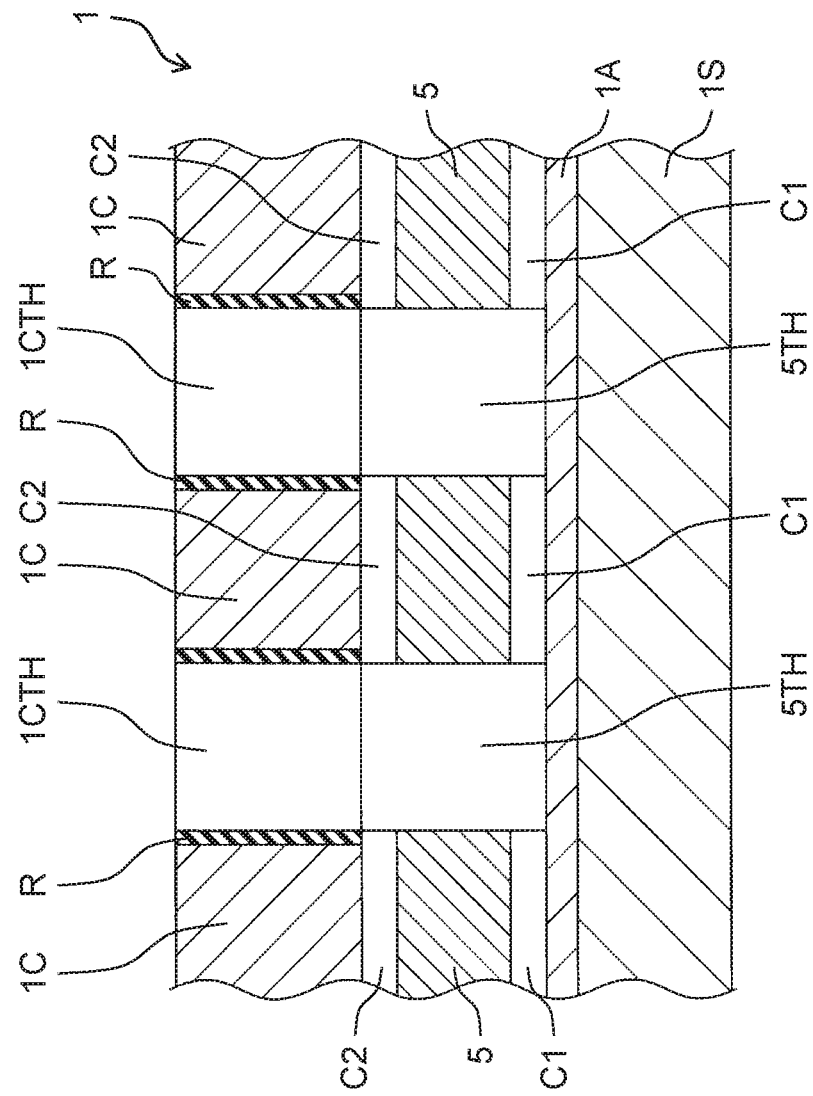
FIG. 4 is an enlarged longitudinal sectional view of the layered structure of the electrolyzed water generator of the first exemplary embodiment.

As shown in FIG. 4, in each of first electrolyzed water generator 100A and second electrolyzed water generator 100B, when no voltage is applied to anode 1A and cathode 1C and raw water does not flow, a chemical action does not substantially occur.

Figure 5:
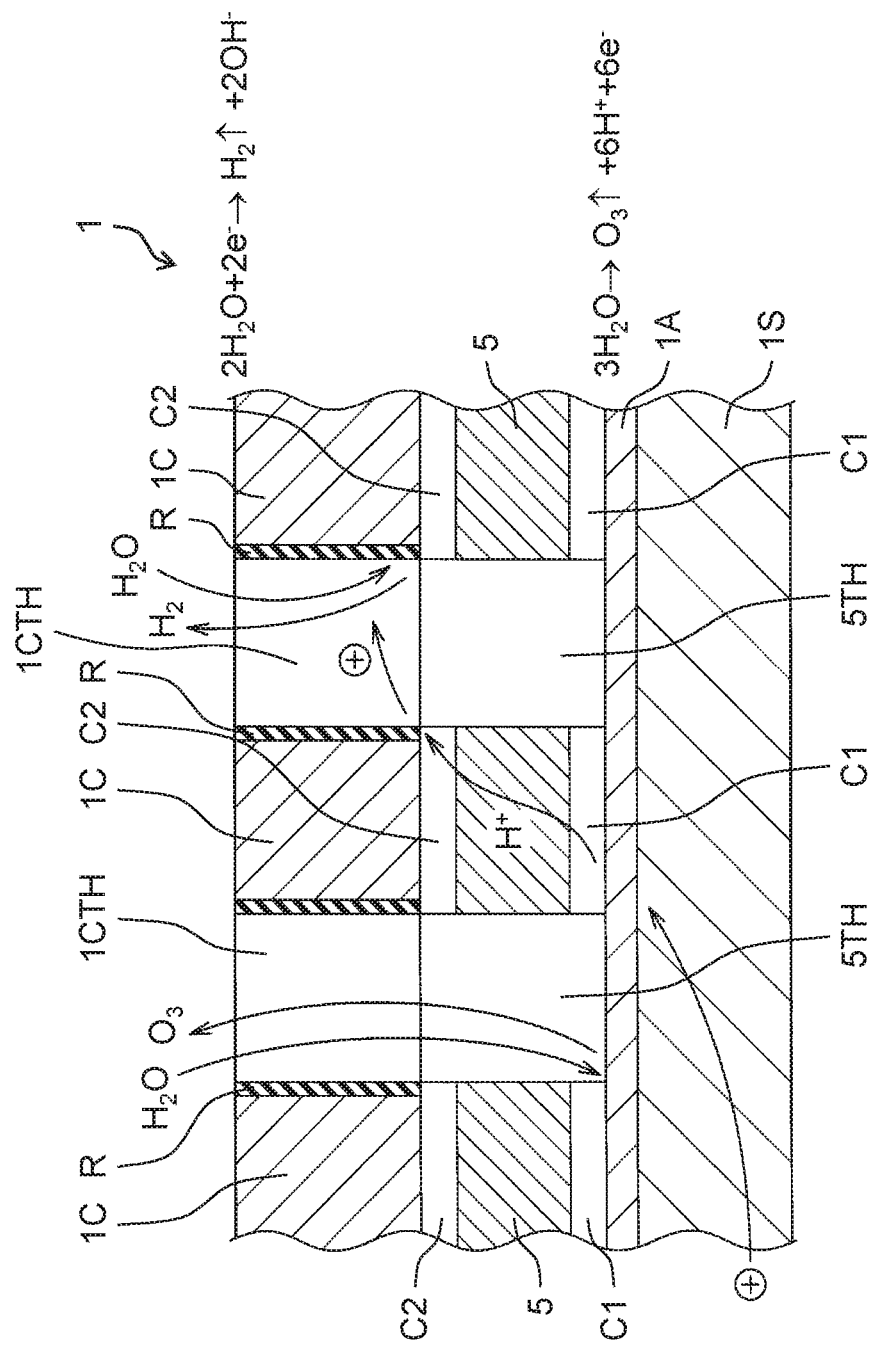
FIG. 5 is a first diagram for explaining a chemical action of the electrolyzed water generator of the first exemplary embodiment.

As shown in FIG. 5, when a voltage is applied to anode 1A and cathode 1C, the following chemical action occurs.

At anode 1A

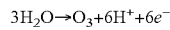

$3H_2O \rightarrow O_3 + 6H^+ + 6e^-$

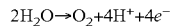

$2H_2O \rightarrow O_2 + 4H^+ + 4e^-$

At cathode 1C

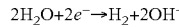

$2H_2O + 2e^- \rightarrow H_2 + 2OH^-$

That is, in each of first electrolyzed water generator 100A and second electrolyzed water generator 100B, oxygen and ozone are generated near anode 1A, and hydrogen is generated near cathode 1C. Whether ozone is generated near anode 1A depends on the voltage applied between anode 1A and cathode 1C. In the present exemplary embodiment, it is assumed that at an interface between anode 1A and cation exchange membrane 5, a voltage sufficient to generate ozone is applied between anode 1A and cathode 1C. However, at the interface between anode 1A and cation exchange membrane 5, a voltage with which no ozone is generated may be applied between anode 1A and cathode 1C. As an electrode for generating ozone, for example, a lead dioxide electrode, a diamond electrode, a platinum electrode, a tantalum oxide electrode, or the like may be used.

Figure 6:
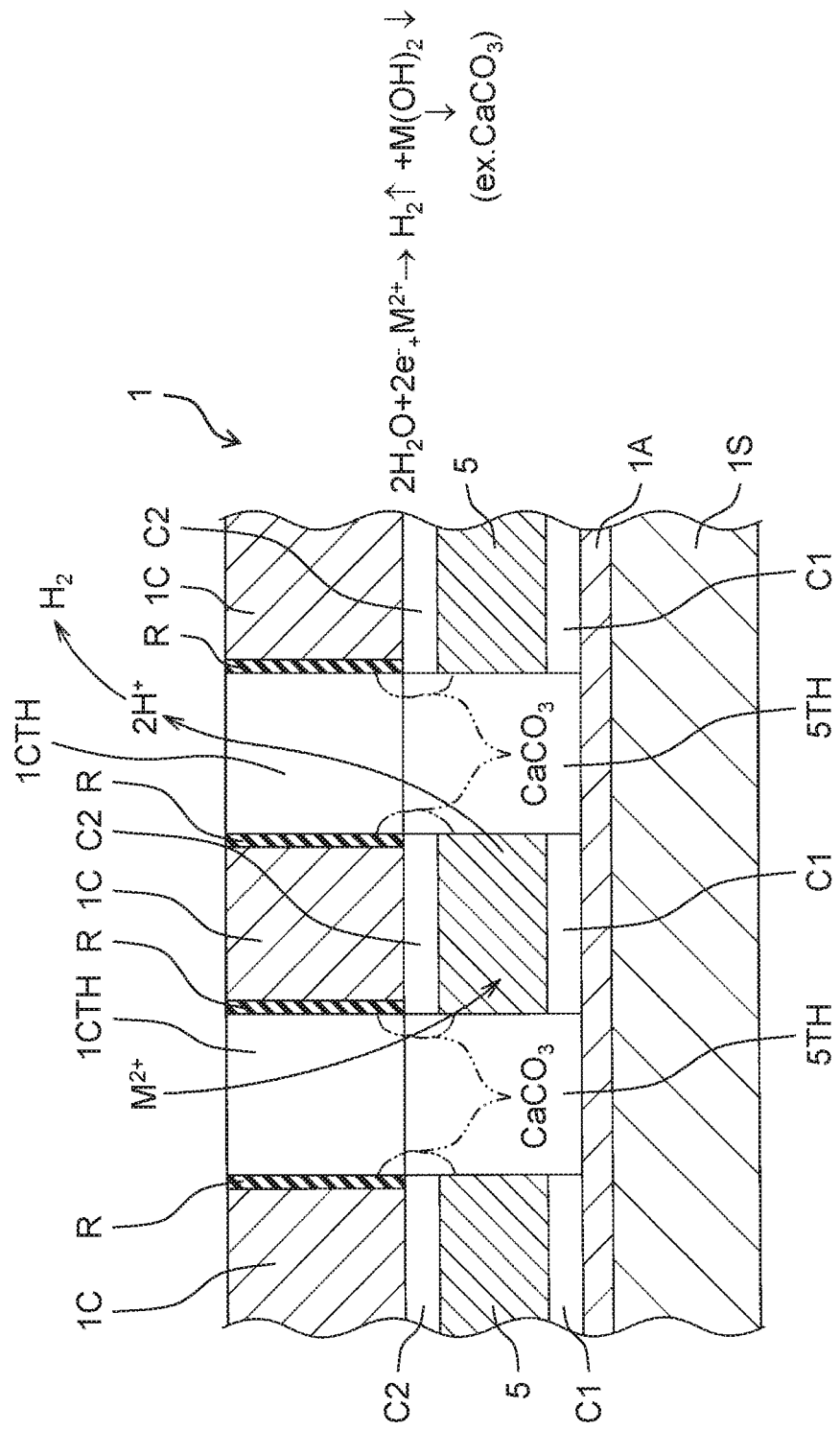
FIG. 6 is a second diagram for explaining the chemical action of the electrolyzed water generator of the first exemplary embodiment.

As shown in FIG. 6, when raw water continues to be supplied to cation exchange membrane 5 in a state where no voltage is applied between anode 1A and cathode 1C, cation exchange membrane 5 incorporates metal cations ($M^+$) contained in the raw water and releases hydrogen ions ($H^+$) into the raw water. When hydrogen ions ($H^+$) are bound to each other, hydrogen ($H_2$) is generated. The metal cation ($M^+$) is, for example, calcium ion ($Ca^{2+}$) or sodium ion ($Na^+$).

Then, when a voltage is applied between anode 1A and cathode 1C, a chemical reaction: $2H_2O + 2e^- + M^{2+} \rightarrow H_2 + M(OH)_2$ occurs near the interface between anode 1A and cation exchange membrane 5. That is, a metal cation (for example, $Ca^{2+}$ or $Na^+$) contained in the raw water is bound to a hydroxide ion (OH) near anode 1A to generate a metal hydroxide $M(OH)_2$.

For example, when a metal cation ($M^{2+}$) is a calcium ion ($Ca^{2+}$), carbonate ion ($CO^{2-}$) and calcium ion ($Ca^{2+}$) in water are bound. A scale ($CaC_3$) is generated by binding of the carbonate ion ($CO^{2-}$) and the calcium ion ($Ca^{2+}$) in water. Thus, as shown by two-dot chain lines in FIG. 6, the scale ($CaCO_3$) may adhere to inner peripheral surfaces of membrane hole 5TH and cathode hole 1CTH near the interface between cathode 1C and cation exchange membrane 5. However, according to first electrolyzed water generator 100A and second electrolyzed water generator 100B of the present exemplary embodiment, due to the presence of high electrical resistance material R described later, the adhesion of the scale ($CaCO_3$) to the inner peripheral surfaces of membrane hole 5TH and cathode hole 1CTH is suppressed. As a result, a decrease in ozone generation efficiency due to narrowing of membrane hole 5TH and cathode hole 1CTH by the scale ($CaCO_3$) adhering to the inner peripheral surfaces of membrane hole 5TH and cathode hole 1CTH is suppressed.

(Gap)

Anode 1A and cation exchange membrane 5 are in contact with each other. This is because it is preferable to improve efficiency of movement of the positive charges from anode 1A to cation exchange membrane 5 in order to increase generation efficiency of electrolyzed water. Therefore, ozone bubbles may be retained in a small space between contact surfaces of anode 1A and cation exchange membrane 5 where water does not flow. Thus, in the present exemplary embodiment, gap C1 in which a flow of water occurs is provided between anode 1A and cation exchange membrane 5 such that the flow of water occurs between anode 1A and cation exchange membrane 5. As a result, ozone present between the contact surface of anode 1A and the contact surface of cation exchange membrane 5 is naturally mixed into water by a siphon action caused by a flow of water passing through gap C1 in directions along the respective contact surfaces of anode 1A and cation exchange membrane 5. That is, gap C1 is a path through which water flows from one end of cation exchange membrane 5 to the other end of cation exchange membrane 5. Therefore, it is suppressed that ozone is retained between anode 1A and cation exchange membrane 5. From the above, it is possible to suppress an increase in the voltage applied between anode 1A and cathode 1C, which is necessary for generating electrolyzed water.

Cation exchange membrane 5 and cathode 1C are in contact with each other. This is because it is preferable to improve efficiency of movement of the positive charges from cation exchange membrane 5 to cathode 1C in order to increase the generation efficiency of electrolyzed water. Therefore, hydrogen bubbles may be retained in a small space between contact surfaces of cation exchange membrane 5 and cathode 1C where water does not flow. Thus, in the present exemplary embodiment, gap C2 in which a flow of water occurs is provided between cation exchange membrane 5 and cathode 1C such that the flow of water occurs between cation exchange membrane 5 and cathode 1C. As a result, hydrogen present between the contact surface of cation exchange membrane 5 and the contact surface of cathode 1C is naturally mixed into water by the siphon action caused by a flow of water passing through gap C2 in a direction parallel to the respective contact surfaces of cation exchange membrane 5 and cathode 1C. That is, gap C2 is a path through which water flows from one end of cation exchange membrane 5 to the other end of cation exchange membrane 5. Thus, it is suppressed that hydrogen is retained between cation exchange membrane 5 and cathode 1C. From the above, it is possible to suppress an increase in the voltage applied between anode 1A and cathode 1C, which is necessary for generating electrolyzed water.

Figure 7:
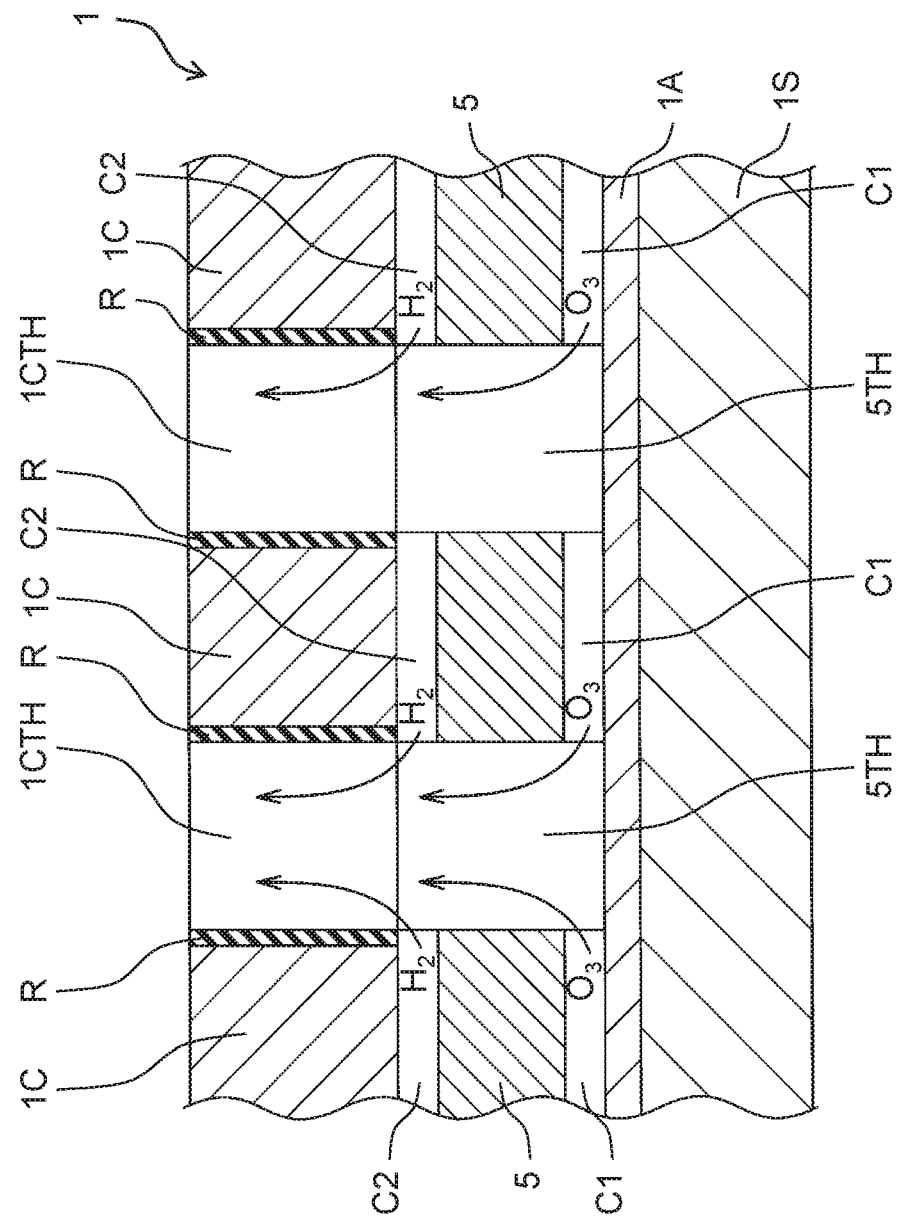
FIG. 7 is a third diagram for explaining the chemical action of the electrolyzed water generator of the first exemplary embodiment.

As shown in FIG. 7, gap C1 is a groove or a cutout provided in a surface of cation exchange membrane 5 facing anode 1A. However, gap C1 may be a groove or a cutout formed in a surface of anode 1A facing cation exchange membrane 5. Gap C1 may be the groove or the cutout formed in the surface of cation exchange membrane 5 facing anode 1A and the groove or the cutout formed in the surface of anode 1A facing cation exchange membrane 5. In other words, gap C1 is a groove or a cutout formed in at least one of the surface of cation exchange membrane 5 facing anode 1A and the surface of anode 1A facing cation exchange membrane 5. Gap C1 may be naturally formed between anode 1A and cation exchange membrane 5 during manufacturing.

Gap C1 is actually a large number of fine cutouts or grooves formed in a non-woven fabric forming cation exchange membrane 5, unlike the large groove or cutout as illustrated in the drawings. The position and size of gap C1 are not limited as long as gap C1 has a portion where a flow of water occurs between anode 1A and cation exchange membrane 5 and anode 1A and cation exchange membrane 5 are in contact with each other.

As shown in FIG. 7, gap C2 is a groove or a cutout provided in a surface of cation exchange membrane 5 facing cathode 1C. However, gap C2 may be a groove or a cutout formed in a surface of cathode 1C facing cation exchange membrane 5. Gap C2 may be the groove or the cutout formed in the surface of cation exchange membrane 5 facing cathode 1C and the groove or the cutout formed in the surface of cathode 1C facing cation exchange membrane 5. In other words, gap C2 is a groove or a cutout formed in at least one of the surface of cation exchange membrane 5 facing cathode 1C and the surface of cathode 1C facing cation exchange membrane 5. Gap C2 may be naturally formed between cathode 1C and cation exchange membrane 5 during manufacturing.

Gap C2 is actually a large number of fine cutouts or grooves formed in a non-woven fabric forming cation exchange membrane 5, unlike the large groove or cutout as illustrated in the drawings. The position and size of gap C2 are not limited as long as gap C2 has a portion where a flow of water occurs between cation exchange membrane 5 and cathode 1C and cation exchange membrane 5 and cathode 1C are in contact with each other.

As shown in FIG. 7, anode 1A and cathode 1C each have a flat plate shape. Flat plate-shaped anode 1A, cation exchange membrane 5, and flat plate-shaped cathode 1C form (configure) layered structure 1 in which these are stacked in this order. Cation exchange membrane 5 has a plurality of membrane holes 5TH penetrating in a thickness direction of cation exchange membrane 5. Cathode 1C has a plurality of cathode holes 1CTH penetrating in a thickness direction of cathode 1C and communicating with each of the plurality of membrane holes 5TH. Therefore, a surface of anode 1A on a side of cation exchange membrane 5, inner surfaces of the plurality of membrane holes 5TH, and inner surfaces of the plurality of cathode holes 1CTH form a plurality of hole portions. That is, the plurality of hole portions are configured such that the surface of anode 1A on the side of cation exchange membrane 5 is the bottom surface and the inner surfaces of the plurality of membrane holes 5TH and the inner surfaces of the plurality of cathode holes 1CTH are the peripheral surfaces.

As shown in FIG. 7, gap C1 between anode 1A and cation exchange membrane 5 communicates adjacent hole portions of the plurality of hole portions, formed in the layered structure 1, with each other. Thus, ozone present between anode 1A and cation exchange membrane 5 efficiently mixes into the flow of water. Gap C2 between cation exchange membrane 5 and cathode 1C communicates adjacent hole portions of the plurality of hole portions, formed in the layered structure 1, with each other. Thus, hydrogen present between cation exchange membrane 5 and cathode 1C efficiently mixes into water.

(High Electrical Resistance Material)

As can be seen from FIGS. 4 to 8, the inner peripheral surface of cathode hole 1CTH is covered with high electrical resistance material R having an electrical resistance value higher than the electrical resistance value of cathode 1C. In other words, high electrical resistance material R is provided in cathode hole 1CTH and has an electrical resistance value higher than the electrical resistance value of cathode 1C. Thus, in the inner peripheral surface of cathode hole 1CTH, force of attracting cations contained in water is weakened. This suppresses the retention of cations in cathode hole 1CTH. Thus, binding between the cation retained on the inner peripheral surface of cathode hole 1CTH and an anion contained in water is suppressed. As a result, generation of a scale due to the binding of cation and anion is suppressed. Therefore, a decrease in the ability to generate electrolyzed water due to retention of the scale in cathode hole 1CTH is suppressed.

In the present exemplary embodiment, high electrical resistance material R may be configured by changing the inner peripheral surface of stainless steel cathode hole 1CTH forming cathode 1C by heating or a chemical reaction. The entire inner peripheral surface of cathode hole 1CTH is preferably covered with high electrical resistance material R. High electrical resistance material R is preferably an insulating material.

In addition, of the contact surface between cathode 1C and cation exchange membrane 5, a portion around the inner peripheral surface of cathode hole 1CTH, for example, a portion of the lower surface and the upper surface of cathode 1C may also be covered with high electrical resistance material R. However, since cathode 1C and cation exchange membrane 5 are in contact with each other at any position (portion), the cation can be transferred from cation exchange membrane 5 to cathode 1C. According to this, the generation of the scale is more reliably suppressed.

In addition, it is preferable that the entire inner peripheral surface of each of the plurality of cathode holes 1CTH be covered with high electrical resistance material R. According to this, the generation efficiency of electrolyzed water is increased, and the generation of the scale is more reliably suppressed.

High electrical resistance material R is a coating material applied to cathode 1C. Specifically, high electrical resistance material R is a coating material applied to cathode hole 1CTH (inner peripheral surface of cathode 1C). Thus, high electrical resistance material R easily adheres to the inner peripheral surface of cathode 1C.

High electrical resistance material R is preferably an insulating material. When high electrical resistance material R is an insulating material, the generation of the scale is more reliably suppressed.

In the present exemplary embodiment, cathode 1C is formed (configured) of a stainless steel material, and high electrical resistance material R is formed (configured) of a fluorine resin material. Thus, both a value of adhesion strength between cathode 1C and the coating material and a required electrical resistance value of the coating material can be set to desired values.

(Cathode and High Electrical Resistance Material of Another Example)

Figure 8:
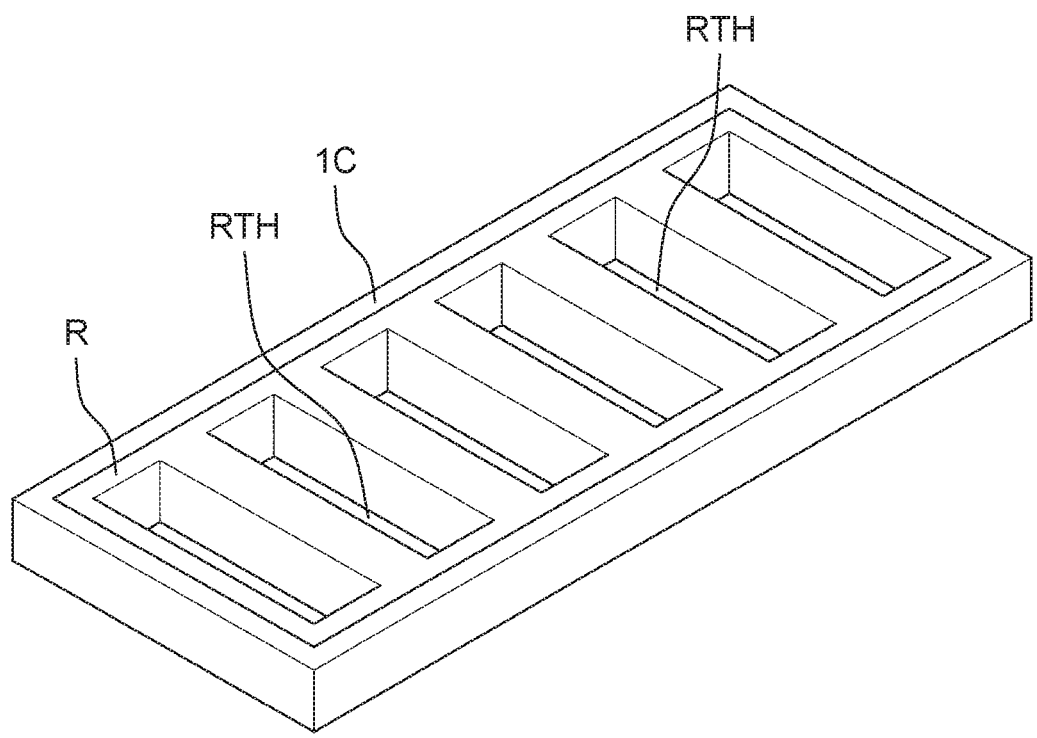
FIG. 8 is a perspective view of a cathode of another example of the electrolyzed water generator of the first exemplary embodiment.

As shown in FIG. 8, first electrolyzed water generator 100A and second electrolyzed water generator 100B may include cathode 1C of another example. Cathode 1C of the other example has a frame shape. A lower surface of cathode 1C having a frame shape in the other example is provided to be in contact with the upper surface of cation exchange membrane 5. In this case, gap C1 and gap C2 may not be provided in cation exchange membrane 5.

High electrical resistance material R is fitted into frame-shaped cathode 1C so as to cover the inner peripheral surface of frame-shaped cathode 1C. In other words, high electrical resistance material R is provided on an inner periphery of frame-shaped cathode 1C so as to be in contact with the inner peripheral surface of frame-shaped cathode 1C. High electrical resistance material R has a structure like a lattice window. Specifically, high electrical resistance material R has an outer shape of a plate-shaped member and has a plurality of communication holes RTH that communicate with the plurality of membrane holes 5TH, respectively. That is, the plurality of communication holes RTH penetrate high electrical resistance material R so as to communicate with the plurality of membrane hole 5TH, respectively. High electrical resistance material R has an electrical resistance value higher than the electrical resistance value of the cathode.

According to this, the inner peripheral surface of frame-shaped cathode 1C and the inner peripheral surface of each of the plurality of membrane holes 5TH of cation exchange membrane 5 are insulated by high electrical resistance material R. Therefore, a possibility (probability) of scale generation near membrane hole 5TH is reduced. Below membrane hole 5TH, ozone generated on the upper surface of anode 1A exposed to water is mixed into water flowing above cathode 1C through the plurality of communication holes RTH.

(Switching Control of System)

Figure 9:
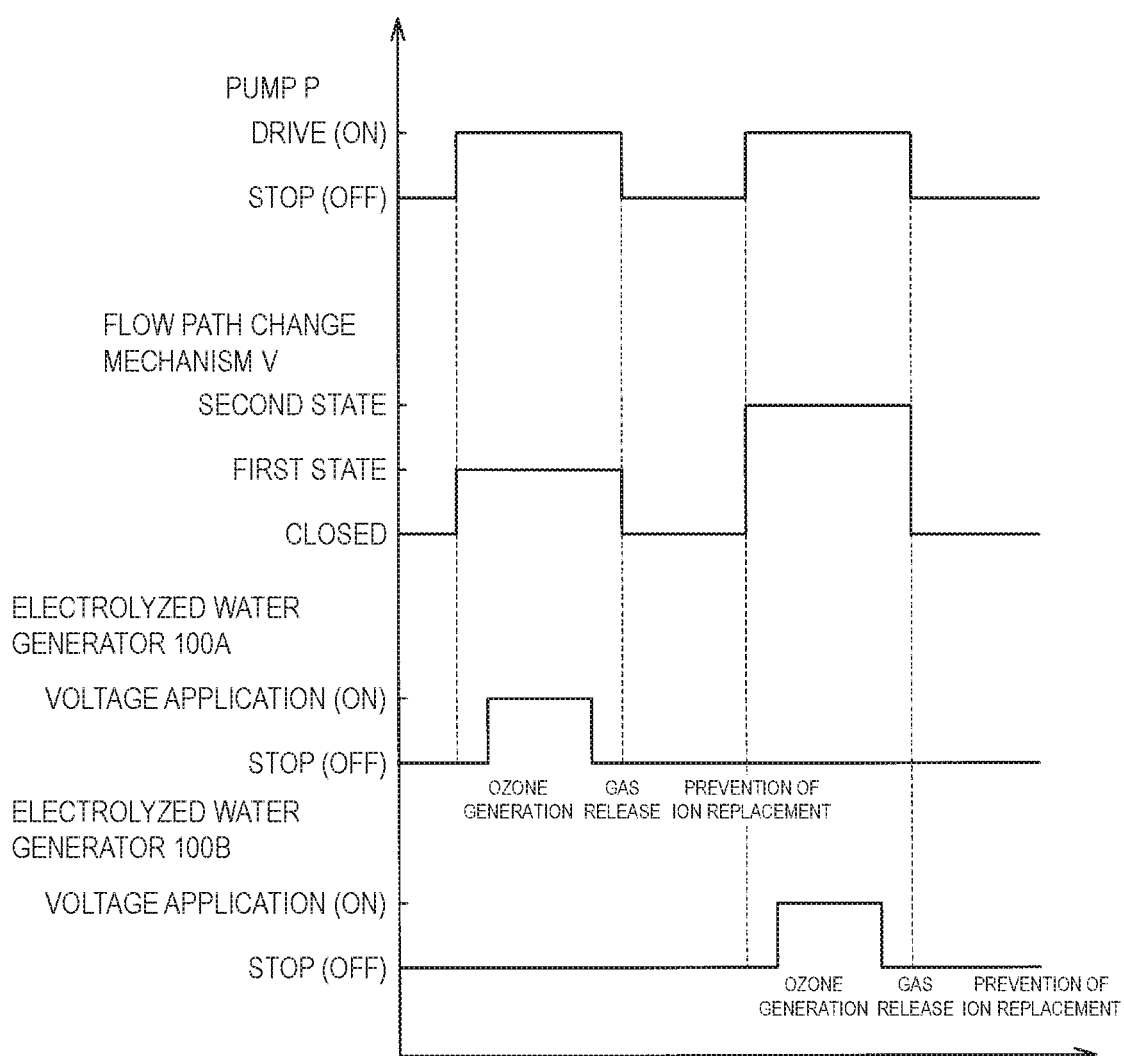
FIG. 9 is a timing chart for explaining a control mode of the electrolyzed water generation system of the first exemplary embodiment.

As shown in FIG. 9, controller CD drives (ON) pump P to feed raw water into trunk flow path 15. Flow path change mechanism V is selectively switched to either the first state or the second state by controller CC. In the present exemplary embodiment, the first state is a state where flow path change mechanism V guides (supplies) the raw water from trunk flow path 15 to upstream-side first branch flow path 10A. The second state is a state where flow path change mechanism V guides (supplies) the raw water from trunk flow path 15 to upstream-side second branch flow path 10B.

First, controller CC switches flow path change mechanism V from a closed state to the first state. Consequently, the raw water is guided from trunk flow path 15 to upstream-side first branch flow path 10A. After that, the raw water is supplied to first electrolyzed water generator 100A.

Next, at any time during a period in which flow path change mechanism V is in the first state, controller CA executes control in which first electrolyzed water generator 100A generates electrolyzed water, that is, control in which first electrolyzed water generator 100A is brought into the first generation state. That is, a voltage is applied between anode 1A and cathode 1C of first electrolyzed water generator 100A. In first electrolyzed water generator 100A, electrolyzed water is generated by applying (ON) the voltage between anode 1A and cathode 1C. In other words, controller CA applies the voltage between anode 1A and cathode 1C of first electrolyzed water generator 100A and thereby performs control to switch first electrolyzed water generator 100A from the first non-generation state to the first generation state.

When flow path change mechanism V is in the first state, controller CB executes control in which second electrolyzed water generator 100B does not generate electrolyzed water, that is, control in which second electrolyzed water generator 100B is brought into the second non-generation state. That is, no voltage is applied between anode 1A and cathode 1C of second electrolyzed water generator 100B. In other words, second electrolyzed water generator 100B is in a stopped (OFF) state.

After that, controller CD executes control to stop pump P, and controller CC switches flow path change mechanism V from the first state to the closed state. At this time, in first electrolyzed water generator 100A, controller CA does not apply a voltage between cathode 1C and anode 1A. In second electrolyzed water generator 100B, controller CB does not apply a voltage between cathode 1C and anode 1A.

Next, while controller CD is executing control to drive pump P, controller CC switches flow path change mechanism V from the closed state to the second state. Consequently, the raw water is guided from trunk flow path 15 to upstream-side second branch flow path 10B. After that, the raw water is supplied to second electrolyzed water generator 100B.

When flow path change mechanism V is in the second state, controller CA executes control in which first electrolyzed water generator 100A does not generate electrolyzed water, that is, control in which first electrolyzed water generator 100A is brought into the first non-generation state. That is, no voltage is applied between anode 1A and cathode 1C of first electrolyzed water generator 100A. In other words, first electrolyzed water generator 100A is in a stopped (OFF) state.

Next, at any time during a period in which flow path change mechanism V is in the second state, controller CB executes control in which second electrolyzed water generator 100B generates electrolyzed water, that is, control in which second electrolyzed water generator 100B is brought into the second generation state. That is, a voltage is applied between anode 1A and cathode 1C of second electrolyzed water generator 100B. In second electrolyzed water generator 100B, electrolyzed water is generated by applying (ON) the voltage between anode 1A and cathode 1C. In other words, controller CB applies the voltage between anode 1A and cathode 1C of second electrolyzed water generator 100B and thereby performs control to switch second electrolyzed water generator 100B from the second non-generation state to the second generation state.

Generally, when first electrolyzed water generator 100A and second electrolyzed water generator 100B are continuously used, the scale adheres to cathode 1C or the like due to an increase in pH of electrolyzed water. The scales include what are called calcium scales, magnesium scales, and hardness component scales. Examples of these scales include calcium carbonate, magnesium carbonate, calcium sulfate, magnesium hydroxide, and calcium phosphate, and iron hydroxide and iron oxide as examples of scales called iron salt scales (iron rust).

When the scale is generated, the value of the current flowing between anode 1A and cathode 1C decreases. In this case, controller CA or CB executes control to increase the value of the voltage applied between anode 1A and cathode 1C. Therefore, if first electrolyzed water generator 100A is continuously used, the generation efficiency of electrolyzed water by first electrolyzed water generator 100A decreases. On the other hand, if second electrolyzed water generator 100B is continuously used, the generation efficiency of electrolyzed water by second electrolyzed water generator 100B decreases.

From the above, in order to suppress the scale generation, it is conceivable to shorten a period of continuous use of each of first electrolyzed water generator 100A and second electrolyzed water generator 100B. Thus, the electrolyzed water generator that generates electrolyzed water and the electrolyzed water generator that does not generate electrolyzed water are switched such that the period of use of each electrolyzed water generator is divided. According to this, the period of use of each of first electrolyzed water generator 100A and second electrolyzed water generator 100B is shortened. On the other hand, electrolyzed water generation system 1000 as a whole continuously generates electrolyzed water. As a result, the increase in the voltage applied between anode 1A and cathode 1C is suppressed in order to obtain electrolyzed water of a desired concentration, and the ability to generate electrolyzed water is maintained.

(Intermittent Operation Control of System)

As shown in FIG. 9, controller CA of first electrolyzed water generator 100A and controller CB of second electrolyzed water generator 100B both intermittently apply the voltage between anode 1A and cathode 1C. Thus, while the application of the voltage between anode 1A and cathode 1C is stopped, ozone retained between anode 1A and cation exchange membrane 5 flows out into water, and hydrogen retained between cation exchange membrane 5 and cathode 1C flows out into water. As a result, retention of ozone between anode 1A and cation exchange membrane 5 is suppressed, and retention of hydrogen between cation exchange membrane 5 and cathode 1C is suppressed.

As shown in FIG. 9, controllers CA, CB, CC, CD control pump P and flow path change mechanism V. Consequently, raw water is guided to electrolyzed water generators 100A, 100B not only during the period in which the voltage is applied between anode 1A and cathode 1C but also during a portion of the period in which the application of the voltage is stopped. More specifically, in addition to the period in which the voltage is applied between anode 1A and cathode 1C, during a predetermined period before and after the period in which the voltage is applied between anode 1A and cathode 1C, the raw water is guided to electrolyzed water generators 100A, 100B. In other words, the raw water is supplied to electrolyzed water generators 100A, 100B during the period in which no voltage is applied between anode 1A and cathode 1C. Thus, retention of ozone between anode 1A and cation exchange membrane 5 is more reliably suppressed, and retention of hydrogen between cation exchange membrane 5 and cathode 1C is more reliably suppressed. Controller CD may control switching between drive (ON) and stop (OFF) of pump P so as to deliver the raw water to trunk flow path 15 in synchronization with switching between application (ON) and stop (OFF) of the voltage.

(Operation of Electrolyzed Water Generation System)

An operator operates input unit I and transmits a command signal from input unit I to controllers CA, CB, CC, CD. Consequently, first, pump P is driven, and raw water is fed to first electrolyzed water generator 100A. Then, a voltage is applied between anode 1A and cathode 1C of first electrolyzed water generator 100A. Consequently, electrolyzed water is generated in first electrolyzed water generator 100A. In the present exemplary embodiment, ozone bubbles are generated near an interface between cation exchange membrane 5 and anode 1A in first electrolyzed water generator 100A. Hydrogen is generated near an interface between cation exchange membrane 5 and cathode 1C in first electrolyzed water generator 100A. Ozone bubbles and hydrogen bubbles are dissolved in the raw water. As a result, ozone water is generated as electrolyzed water.

As time passes in a state where the voltage is applied between anode 1A and cathode 1C of first electrolyzed water generator 100A, ozone bubbles are retained in an inevitable gap between anode 1A and cation exchange membrane 5, that is, a gap closed to the extent that water does not now. The inevitable gap is so small that it cannot be shown. Ozone bubbles retained in the inevitable gap function as an insulator between anode 1A and cathode 1C. However, ozone retained in the inevitable gap between anode 1A and cation exchange membrane 5 is sucked into water by the siphon action caused by a flow of water flowing through gap C1 and flows out from first electrolyzed water generator 100A to downstream-side first branch flow path 20A.

As time passes in the state where the voltage is applied between anode 1A and cathode 1C of first electrolyzed water generator 100A, hydrogen bubbles are retained in an inevitable gap between cation exchange membrane 5 and cathode 1C. The inevitable gap is so small that it cannot be shown. Hydrogen bubbles retained in the inevitable gap function as an insulator between anode 1A and cathode 1C. However, hydrogen retained in the inevitable gap between cathode 1C and cation exchange membrane 5 is sucked into water by the siphon action caused by a flow of water flowing through gap C2 and flows out from first electrolyzed water generator 100A to downstream-side first branch flow path 20A.

In the above case, hydroxide ion concentration increases in a hole portion formed by membrane hole 5TH, cathode hole 1CTH (or communication hole RTH), and the surface of anode 1A of layered structure 1 of first electrolyzed water generator 100A, that is, a slit. As a result, hydroxide salt (scale) is temporarily retained in the hole portion. In the present exemplary embodiment, the inner peripheral surface of cathode hole 1CTH is covered with high electrical resistance material R. Thus, the generated scale is mixed into electrolyzed water without adhering to cathode hole 1CTH, and flows out from first electrolyzed water generator 100A to downstream-side first branch flow path 20A together with the electrolyzed water.

When raw water is fed to first electrolyzed water generator 100A, the raw water is not fed to second electrolyzed water generator 100B. Thus, it is suppressed that metal cations contained in the raw water are accumulated on cation exchange membrane 5 of second electrolyzed water generator 100B. For example, exchange between hydrogen ions ($H^+$) in cation exchange membrane 5 of second electrolyzed water generator 100B and calcium ions ($Ca^{2+}$) in the raw water is suppressed.

When a predetermined time elapses after the voltage is applied between anode 1A and cathode 1C of first electrolyzed water generator 100A, the application of the voltage between anode 1A and cathode 1C of first electrolyzed water generator 100A is stopped. As a result, generation of ozone between anode 1A and cation exchange membrane 5 and generation of hydrogen between cation exchange membrane 5 and cathode 1C are stopped. After that, pump P continues to be driven only for a predetermined period. As a result, the raw water is fed to first electrolyzed water generator 100A in a state where the application of the voltage between anode 1A and cathode 1C of first electrolyzed water generator 100A is stopped. Consequently, most ozone bubbles retained between anode 1A and cation exchange membrane 5 flow out into the raw water, and then most ozone bubbles are (almost completely) discharged from first electrolyzed water generator 100A together with the raw water. On the other hand, most hydrogen bubbles retained between cation exchange membrane 5 and cathode 1C flow out into the raw water, and then most hydrogen bubbles are (almost completely) discharged from first electrolyzed water generator 100A together with the raw water.

Pump P stops when a predetermined time elapses after the application of the voltage between anode 1A and cathode 1C of first electrolyzed water generator 100A is stopped. This prevents the raw water from being fed to first electrolyzed water generator 100A. Therefore, hydroxide ions ($OH^-$) are almost completely discharged from first electrolyzed water generator 100A. As a result, alkalinity of the raw water inside first electrolyzed water generator 100A is reduced. Therefore, the scale generation in first electrolyzed water generator 100A is suppressed.

After that, while controller CD continues to execute the control to drive pump P, controller CC executes control to switch flow path change mechanism V, so that the raw water that has been fed to first electrolyzed water generator 100A is fed to second electrolyzed water generator 100B. Then, a voltage is applied between anode 1A and cathode 1C of second electrolyzed water generator 100B. Consequently, electrolyzed water is generated in second electrolyzed water generator 100B. In the present exemplary embodiment, ozone bubbles are generated near the interface between cation exchange membrane 5 and anode 1A. Hydrogen is generated near an interface between cation exchange membrane 5 and cathode 1C in second electrolyzed water generator 100B. Ozone bubbles and hydrogen bubbles are dissolved in the raw water. As a result, ozone water is generated as electrolyzed water.

As time passes in a state where the voltage is applied between anode 1A and cathode 1C of second electrolyzed water generator 100B, ozone bubbles are retained in an inevitable gap between anode 1A and cation exchange membrane 5, that is, a gap closed to the extent that water does not flow. The inevitable gap is so small that it cannot be shown. Ozone bubbles retained in the inevitable gap function as an insulator between anode 1A and cathode 1C. However, ozone retained in the inevitable gap between anode 1A and cation exchange membrane 5 is sucked into water by the siphon action caused by a flow of water flowing through gap C1 and flows out from second electrolyzed water generator 100B to downstream-side second branch flow path 20B.

As time passes in the state where the voltage is applied between anode 1A and cathode 1C of second electrolyzed water generator 100B, hydrogen bubbles are retained in an inevitable gap between cation exchange membrane 5 and cathode 1C. The inevitable gap is so small that it cannot be shown. Hydrogen bubbles retained in the inevitable gap function as an insulator between anode 1A and cathode 1C. However, hydrogen retained in the inevitable gap between cathode 1C and cation exchange membrane 5 is sucked into water by the siphon action caused by a flow of water flowing through gap C2 and flows out from second electrolyzed water generator 100B to downstream-side second branch flow path 20B.

In the above case, hydroxide ion concentration increases in a hole portion formed by membrane hole 5TH, cathode hole 1CTH (or communication hole RTH), and the surface of anode 1A of layered structure 1 of second electrolyzed water generator 100B, that is, a slit. As a result, hydroxide salt (scale) is temporarily retained in the hole portion. In the present exemplary embodiment, the inner peripheral surface of cathode hole 1CTH is covered with high electrical resistance material R. Thus, the generated scale is mixed into electrolyzed water without adhering to cathode hole 1CTH, and flows out from second electrolyzed water generator 100B to downstream-side second branch flow path 20B together with the electrolyzed water.

When raw water is fed to second electrolyzed water generator 100B, the raw water is not fed to first electrolyzed water generator 100A. Thus, it is suppressed that metal cations contained in the raw water are accumulated on cation exchange membrane 5 of first electrolyzed water generator 100A. For example, exchange between hydrogen ions ($H^+$) in cation exchange membrane 5 of first electrolyzed water generator 100A and calcium ions ($Ca^{2+}$) in the raw water is suppressed.

When a predetermined time elapses after the voltage is applied between anode 1A and cathode 1C of second electrolyzed water generator 100B, the application of the voltage between anode 1A and cathode 1C of second electrolyzed water generator 100B is stopped. As a result, generation of ozone between anode 1A and cation exchange membrane 5 and generation of hydrogen between cation exchange membrane 5 and cathode 1C are stopped. After that, pump P continues to be driven only for a predetermined period. As a result, raw water is fed to second electrolyzed water generator 100B in a state where the application of the voltage between anode 1A and cathode 1C of second electrolyzed water generator 100B is stopped. Consequently, most ozone bubbles retained between anode 1A and cation exchange membrane 5 flow out into the raw water, and then most ozone bubbles are (almost completely) discharged from second electrolyzed water generator 100B together with the raw water. On the other hand, most hydrogen bubbles retained between cation exchange membrane 5 and cathode 1C flow out into the raw water, and then most hydrogen bubbles are (almost completely) discharged from second electrolyzed water generator 100B together with the raw water.

Pump P stops when a predetermined time elapses after the application of the voltage between anode 1A and cathode 1C of second electrolyzed water generator 100B is stopped. This prevents raw water from being fed to second electrolyzed water generator 100B. Therefore, hydroxide ions (OH) are almost completely discharged from second electrolyzed water generator 100B. As a result, alkalinity of the raw water inside second electrolyzed water generator 100B is reduced. The scale generation in second electrolyzed water generator 100B is suppressed.

After that, while controller CD continues to execute the control to drive pump P, controller CC executes control to switch flow path change mechanism V, so that the raw water that has been fed to second electrolyzed water generator 100B is fed to first electrolyzed water generator 100A. Then, a voltage is applied again between anode 1A and cathode 1C of first electrolyzed water generator 100A.

Electrolyzed water generation system 1000 of the present exemplary embodiment as described above is used for a place where only ozone water for sterilization is used without using ordinary water, for example, for flushing water of a toilet bowl.

Second Exemplary Embodiment

Electrolyzed water generation system 1000 of the present exemplary embodiment is almost the same as electrolyzed water generation system 1000 of first exemplary embodiment. Hereinafter, differences between electrolyzed water generation system 1000 of the present exemplary embodiment and electrolyzed water generation system 1000 of the first exemplary embodiment will be mainly described. Electrolyzed water generator 100A of the present exemplary embodiment is assumed to be the same as first electrolyzed water generator 100A and second electrolyzed water generator 100B of the first exemplary embodiment.

However, electrolyzed water generator 100A of the present exemplary embodiment may be different from first electrolyzed water generator 100A and second electrolyzed water generator 100B of the first exemplary embodiment. For example, in electrolyzed water generator 100A, an ion exchange membrane and a cathode formed of a wire mesh may be wound or bonded in this order by pressure welding on an outside of an anode formed of a platinum wire mesh.

Figure 10:
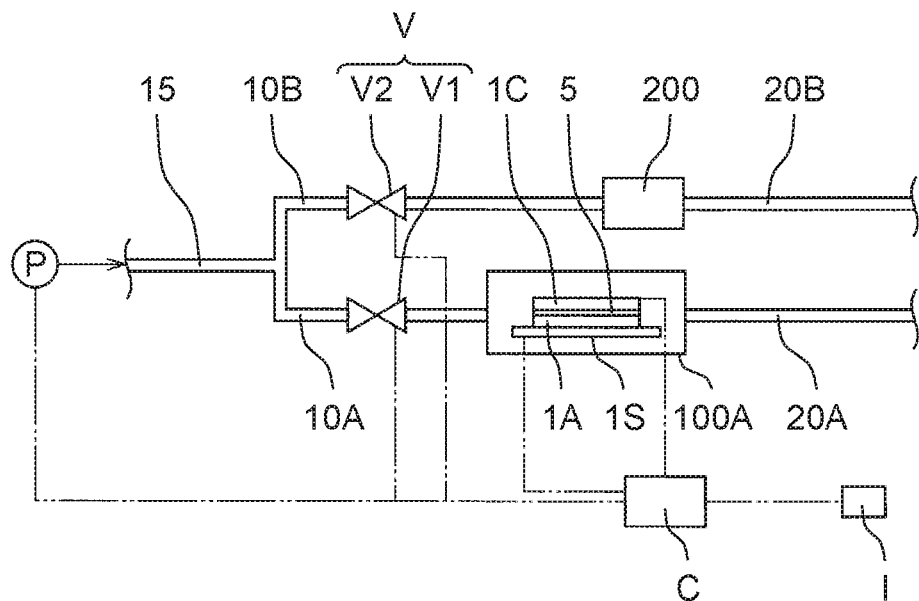
FIG. 10 is a schematic view of an electrolyzed water generation system of a second exemplary embodiment.

As shown in FIG. 10, electrolyzed water generation system 1000 includes trunk flow path 15, upstream-side first branch flow path 10A, downstream-side first branch flow path 20A, electrolyzed water generator 100A, upstream-side second branch flow path 10B, downstream-side second branch flow path 20B, and flow path change mechanism V.

Flow path change mechanism V includes open/close valve V1 and open/close valve V2. In the present exemplary embodiment, open/close valve V1 is provided (connected) to upstream-side first branch flow path 10A. Open/close valve V2 is provided (connected) to upstream-side second branch flow path 10B. Instead of open/close valve V1 and open/close valve V2, a three-way valve as the flow path switching valve of the first exemplary embodiment may be provided at a branch portion between trunk flow path 15 and each of upstream-side first branch flow path 10A and upstream-side second branch flow path 10B.

As shown in FIG. 10, trunk flow path 15 receives raw water delivered by pump P. That is, the raw water is supplied from pump P to trunk flow path 15.

Upstream-side first branch flow path 10A branches from trunk flow path 15.

Electrolyzed water generator 100A includes anode 1A, cathode 1C, and cation exchange membrane 5 provided between anode 1A and cathode 1C. Electrolyzed water generator 100A is connected to upstream-side first branch flow path 10A and downstream-side first branch flow path 20A.

Electrolyzed water generator 100A is switched to either a generation state where electrolyzed water is generated from raw water flowing through upstream-side first branch flow path 10A or a non-generation state where the electrolyzed water is not generated. That is, electrolyzed water generator 100A is switched between the generation state and the non-generation state.

Upstream-side second branch flow path 10B branches from trunk flow path 15 and guides raw water, flowing through trunk flow path 15, to the downstream of trunk flow path 15. Open/close valves V1, V2 are changed to either one of a first state and a second state by controller C. The first state is a state where open/close valve V1 is opened and open/close valve V2 is closed, and a state where the raw water is guided from trunk flow path 15 to upstream-side first branch flow path 10A. The second state is a state where open/close valve V1 is closed and open/close valve V2 is opened, and a state where the raw water is guided from trunk flow path 15 to upstream-side second branch flow path 10B.

According to the above configuration, when no voltage is applied between anode 1A and cathode 1C, open/close valves V1, V2 can be switched to the second state such that the raw water is not supplied to cation exchange membrane 5. That is, controller C brings open/close valve V1 into a closed state and brings open/close valve V2 into an open state. This can suppress that cation exchange membrane 5 in electrolyzed water generator 100A incorporates cations contained in the raw water.

Thus, it is suppressed that when electrolyzed water generator 100A is generating electrolyzed water, that is, when a voltage is applied between anode 1A and cathode 1C, the cations incorporated into cation exchange membrane 5 are released into electrolyzed water. As a result, scale generation due to the release of cations from cation exchange membrane 5 to the electrolyzed water is suppressed.

When electrolyzed water generator 100A is not generating electrolyzed water, water that is not electrolyzed water can be taken out from second branch flow path 20B. Therefore, when electrolyzed water generator 100A is not generating electrolyzed water, it is possible to use water that is not electrolyzed water, for example, water that is not ozone water, while suppressing scale generation.

As shown in FIG. 10, electrolyzed water generation system 1000 includes purification device 200. Purification device 200 is connected between upstream-side second branch flow path 10B and downstream-side second branch flow path 20B and causes the raw water as purified water, flowing through upstream-side second branch flow path 10B, to flow out the downstream of second branch flow path 20B. That is, purification device 200 generates purified water from the raw water flowing through upstream-side second branch flow path 10B. Thus, when electrolyzed water generator 100A does not generate electrolyzed water, purified water can be used instead of the raw water. Purification device 200 may not be provided.

Electrolyzed water generation system 1000 of the present exemplary embodiment as described above can be used for tap water used in domestic kitchens. In this case, while an inner surface of a kitchen sink can be sterilized and washed with ozone water, tap water not containing ozone can be used for washing dishes and the like.

(Electrolyzed Water Generation System of Another Example)

Figure 11:
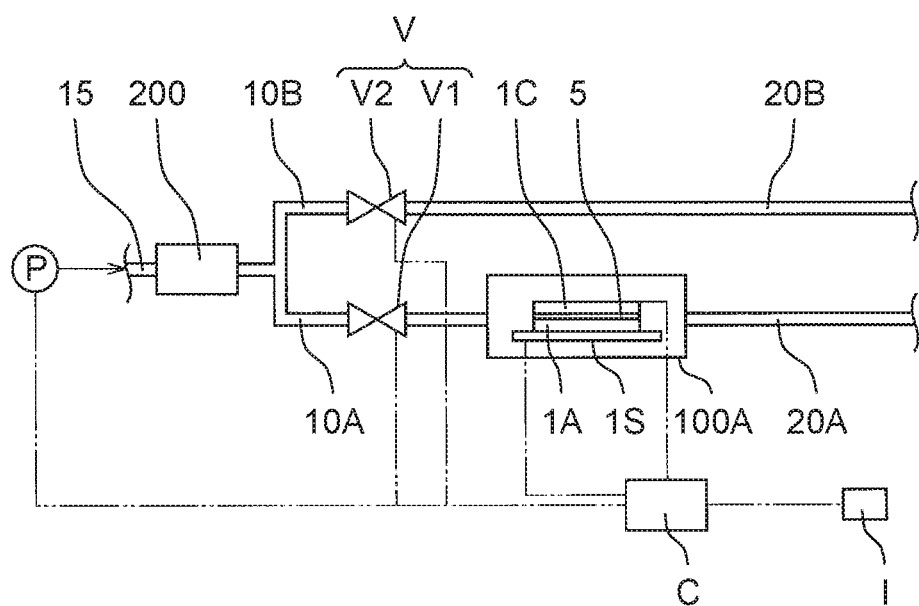
FIG. 11 is a schematic view of the electrolyzed water generation system of another example of the second exemplary embodiment.

As shown in FIG. 11, electrolyzed water generation system 1000 of another example of the second exemplary embodiment includes purification device 200. Purification device 200 is connected to trunk flow path 15. Purification device 200 causes raw water as purified water, flowing through trunk flow path 15, to flow out the downstream of trunk flow path 15. That is, purification device 200 generates purified water from the raw water flowing through trunk flow path 15. Purification device 200 may not be provided.

In electrolyzed water generation system 1000 of the other example, electrolyzed water generator 100A generates electrolyzed water from purified water instead of raw water. Thus, the possibility of foreign matters entering the inside of electrolyzed water generator 100A is reduced. When electrolyzed water generator 100A does not generate electrolyzed water, purified water can be used instead of the raw water.

Figure 12:
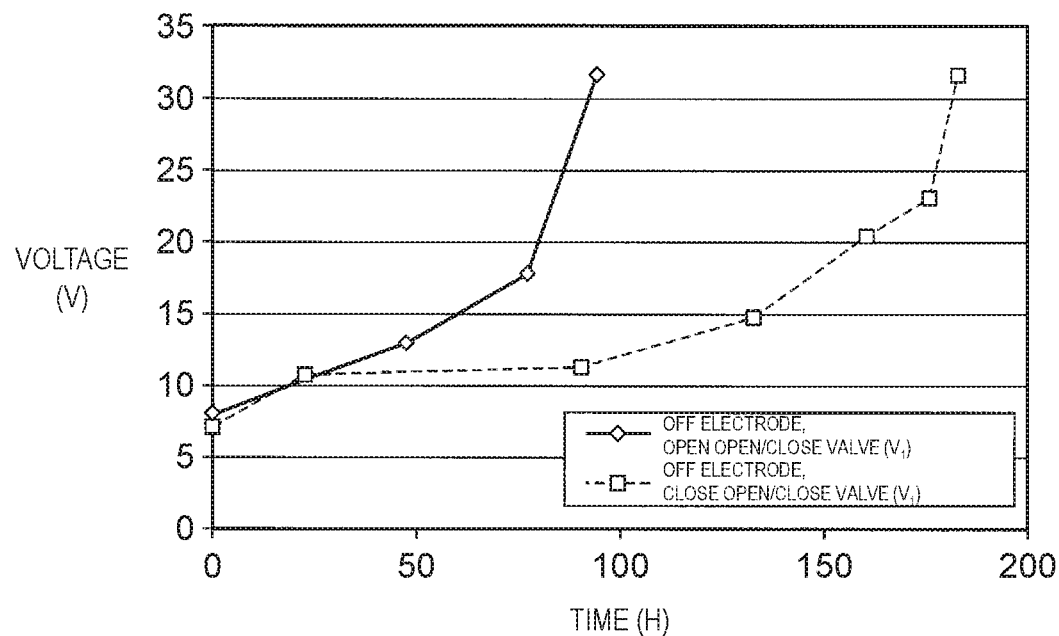
FIG. 12 is a graph showing a relationship between a voltage applied between an anode and a cathode and a time during which the voltage is applied in each of an intermittent drive operation and a continuous drive operation of the electrolyzed water generation system of the second exemplary embodiment.
Figure 13:
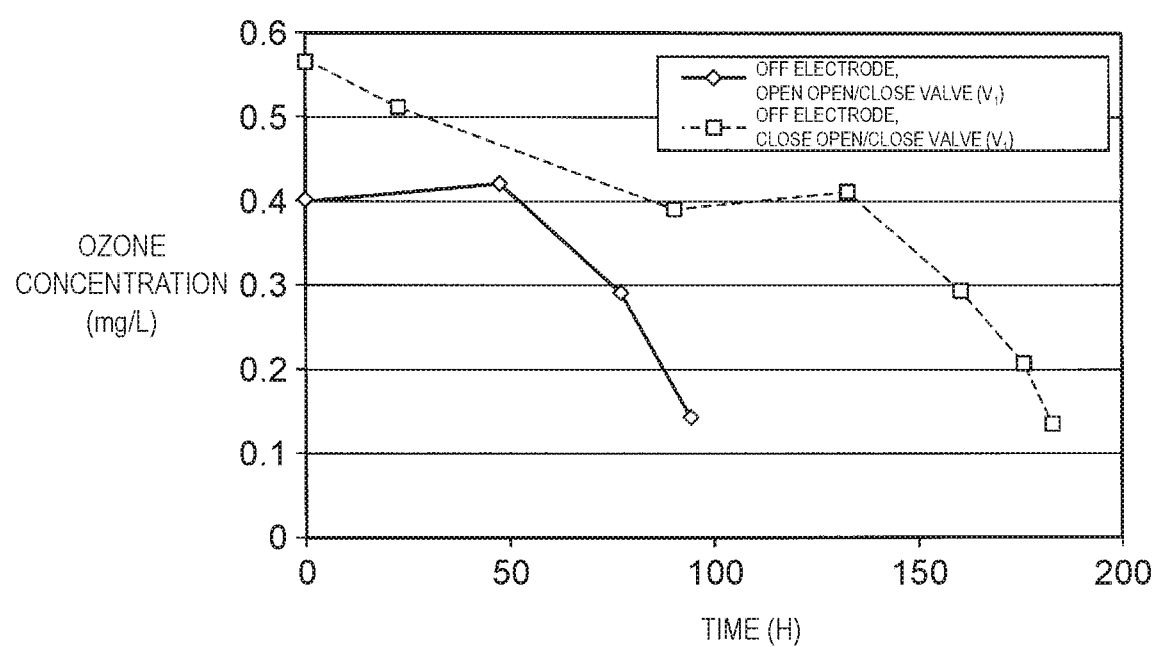
FIG. 13 is a graph showing a relationship between a concentration of ozone generated and the time during which the voltage is applied between the anode and the cathode in each of the intermittent drive operation and the continuous drive operation of the electrolyzed water generation system of the second exemplary embodiment.

Ozone generation efficiency will be compared with reference to FIGS. 12 and 13. FIG. 12 and FIG. 13 are graphs for comparing a form of reduction in the ability to generate ozone water between a case where ozone is continuously generated and a case where ozone is intermittently generated, in one electrolyzed water generator, under a condition that a total time of ozone generation is the same. The ozone water being continuously generated indicates that a voltage is continuously applied between anode 1A and cathode 1C of electrolyzed water generator 100A. The ozone water being intermittently generated indicates that a voltage is intermittently applied between anode 1A and cathode 1C of electrolyzed water generator 100A.

FIG. 12 shows a relationship between time and voltage in electrolyzed water generator 100A in a case where pump P is in an ON state and open/close valve V1 is in the open state when electrodes (A, 1C) are turned off. FIG. 12 also shows a relationship between time and voltage in electrolyzed water generator 100A in a case where pump P is in an OFF state or the ON state and open/close valve V1 is in the closed state when electrodes (A, 1C) are turned off.

FIG. 13 shows a relationship between time and an amount of ozone generation in electrolyzed water generator 100A in the case where pump P is in the ON state and open/close valve V1 is in the open state when electrodes (1A 1C) are turned off. FIG. 13 also shows a relationship between time and the amount of ozone generation in electrolyzed water generator 100A in the case where pump P is in the OFF state or the ON state and open/close valve V1 is in the closed state when electrodes (A, 1C) are turned off.

In FIG. 12 and FIG. 13, "when electrodes (A, 1C) are turned off" means a state where no voltage is applied between anode 1A and cathode 1C of electrolyzed water generator 100A. "Pump P is in the ON state" indicates a state where raw water is flowing through trunk flow path 15 by driving pump P. "Open/close valve V1 is in the open state" indicates a state where the raw water is flowing into electrolyzed water generator 100A by opening open/close valve V1. "Open/close valve V1 is in the closed state" indicates a state where the raw water is not flowing into electrolyzed water generator 100A by closing open/close valve V1.

In FIG. 12, in a case where open/close valve V1 is in the open state when electrodes (1A, 10) are turned off, compared with a case where open/close valve V1 is in the closed state when electrodes (A, 10) are turned off, the voltage applied between anode 1A and cathode 1C increases in a shorter time. In other words, from FIG. 12, it is found that when no voltage is applied between anode 1A and cathode 1C, if the supply of the raw water to electrolyzed water generator 100A is stopped, an increase in the voltage applied between anode 1A and cathode 1C, which is necessary for generating a desired concentration of ozone is suppressed. This is because scale generation near cathode 1C when no voltage is applied between anode 1A and cathode 1C is suppressed.

In FIG. 13, in the case where open/close valve V1 is in the open state when electrodes (1A, 1C) are turned off, compared with the case where open/close valve V1 is in the closed state when the electrodes are turned off, the concentration of ozone obtained downstream of electrolyzed water generator 100A decreases in a shorter time. In other words, from FIG. 13, it is found that when no voltage is applied between anode 1A and cathode 1C, if the supply of the raw water to electrolyzed water generator 100A is stopped, a decrease in ozone concentration is suppressed. This is because scale generation near cathode 1C when no voltage is applied between anode 1A and cathode 1C is suppressed.

Figure 14:
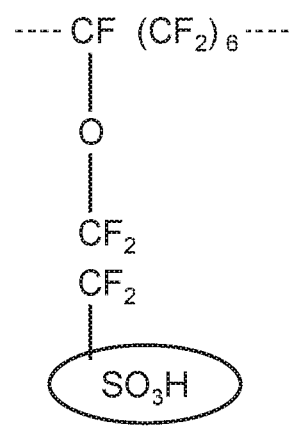
FIG. 14 is a chemical formula of a cation exchange membrane of an electrolyzed water generator of the electrolyzed water generation system of the second exemplary embodiment.
Figure 15:
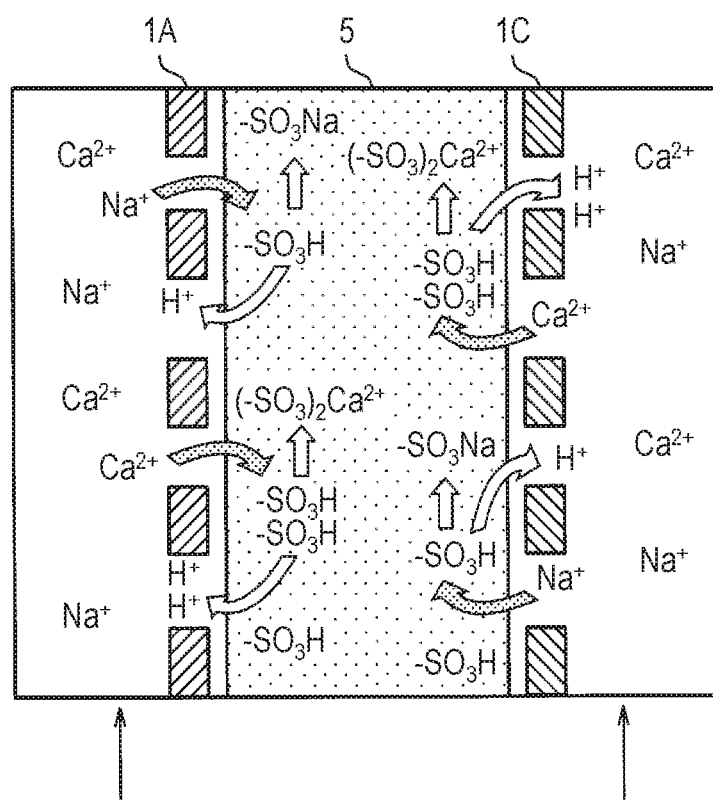
FIG. 15 is a first diagram for explaining a chemical action that occurs inside the electrolyzed water generator of the second exemplary embodiment.

As shown in FIG. 14, cation exchange membrane 5 of electrolyzed water generator 100A of the other example has a sulfonate group ($—SO_3H$). As shown in FIG. 15, when no voltage is applied between anode 1A and cathode 1C, cation exchange membrane 5 accepts metal cations ($Ca^{2+}$, $Na^+$) in water and releases hydrogen ions ($H^+$) into water. That is, the cation is replaced.

As shown in FIG. 15, in first electrolyzed water generator 100A of the other example, anode 1A, cation exchange membrane 5, and cathode 1C may be arranged apart from each other instead of the layered structure. Anode 1A and cathode 1C may have a mesh shape instead of the flat plate shape. In first electrolyzed water generator 100A of the other example, ozone may not be generated, but hydrogen and oxygen may be generated in water.

Figure 16:
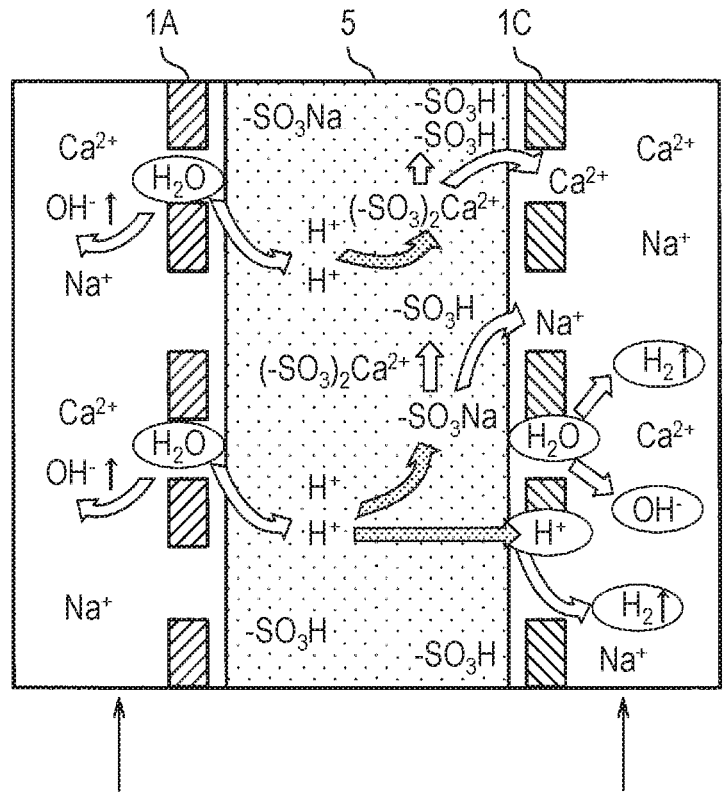
FIG. 16 is a second diagram for explaining the chemical action that occurs inside the electrolyzed water generator of the second exemplary embodiment.

As shown in FIG. 16, immediately after the voltage is applied between anode 1A and cathode 1C, water ($H_2O$) is decomposed into a hydroxyl group ($OH^-$) and a hydrogen ion ($H^+$) near anode 1A. As a result, cation exchange membrane 5 incorporates hydrogen ions ($H^+$) and releases metal cations ($Ca^{2+}$, $Na^+$) into water. Hydrogen ($H_2$) is generated near cathode 1C. Thus, in the state shown in FIG. 16, the concentration of metal cations ($Ca^{2+}$, $Na^+$) in water increases, and the pH of water rises.

Figure 17:
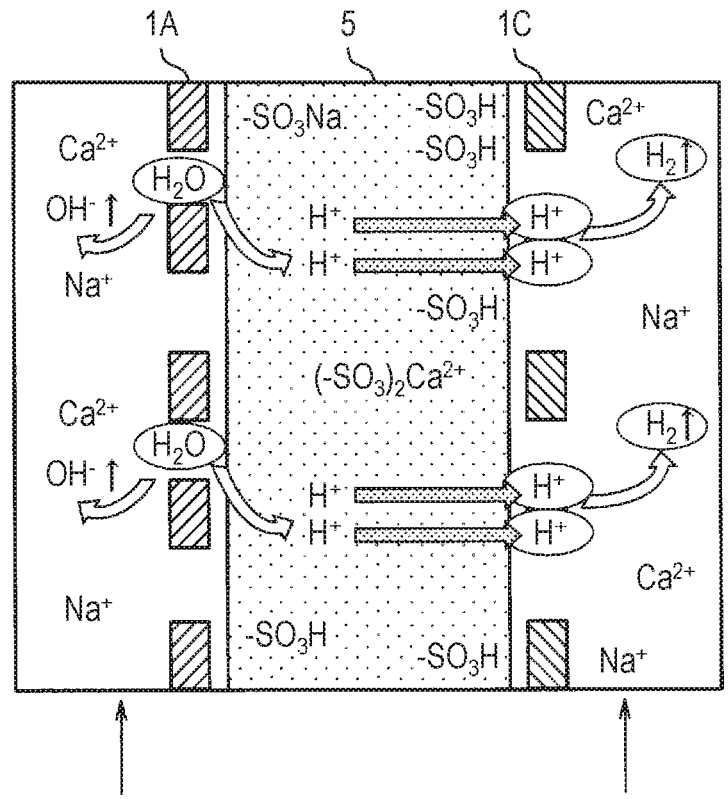
FIG. 17 is a third diagram for explaining the chemical action that occurs inside the electrolyzed water generator of the second exemplary embodiment.

As shown in FIG. 17, when the state where the voltage is applied between anode 1A and cathode 1C is continued, the release of metal cations ($Ca^{2+}$, $Na^+$) into water is stopped. In the state shown in FIG. 17, the concentration of metal cations ($Ca^{2+}$, $Na^+$) in water decreases, and the pH of water decreases.

Also in the case of using electrolyzed water generator 100A of the other example shown in FIGS. 14 to 17, similarly to first electrolyzed water generator 100A and second electrolyzed water generator 100B of the first exemplary embodiment, scale generation is suppressed. Specifically, as in the first present exemplary embodiment described above, scale generation due to the incorporation of metal cations ($Ca^{2+}$, $Na^+$) in cation exchange membrane 5 contained in flowing water is suppressed.

Hereinafter, characteristic configurations of electrolyzed water generators 100A, 100B and electrolyzed water generation system 1000 of the exemplary embodiment and effects obtained thereby will be described.

(1) Electrolyzed water generators 100A, 100B include anode 1A, cathode 1C, and cation exchange membrane 5 provided between anode 1A and cathode 1C so as to be in contact with at least one of anode 1A and cathode 1C. Gaps C1, C2 in which a flow of water occurs are present between cation exchange membrane 5 and at least one of anode 1A and cathode 1C.

According to this, at least one of ozone present between anode 1A and cation exchange membrane 5 and hydrogen present between cation exchange membrane 5 and cathode 1C is naturally mixed into water by the siphon action caused by the flow of water passing through at least one of gap C1 between anode 1A and cation exchange membrane 5 and gap C2 between cation exchange membrane 5 and cathode 1C. Thus, at least one of retention of ozone between anode 1A and cation exchange membrane 5 and retention of hydrogen between cation exchange membrane 5 and cathode 1C is suppressed. As a result, the increase in the voltage applied between anode 1A and cathode 1C, which is necessary for generating electrolyzed water is suppressed.

(2) Gaps C1, C2 may include a groove or a cutout provided in at least one of the surface of cation exchange membrane 5 facing at least one of anode 1A and cathode 1C and the surface of at least one of anode 1A and cathode 1C facing cation exchange membrane 5.

According to this, gaps C1, C2 can be easily formed.

(3) In electrolyzed water generators 100A, 100B, cation exchange membrane 5 is provided in contact with anode 1A and cathode 1C. Cation exchange membrane 5 is provided with membrane hole 5TH penetrating cation exchange membrane 5 so that the surface of anode 1A facing cation exchange membrane 5 is exposed. Cathode 1C is provided with cathode hole 1CTH penetrating cathode 1C so as to communicate with membrane hole 5TH. Cathode hole 1CTH of cathode 1C is provided with high electrical resistance material R having an electrical resistance value higher than the electrical resistance value of cathode 1C.

According to the above configuration, in the inner peripheral surface of cathode hole 1CTH, the force of attracting cations contained in water is weakened. This suppresses the retention of cations in cathode hole 1CTH. Thus, binding between the cation retained on the inner peripheral surface of cathode hole 1CTH and the anion contained in water is suppressed. As a result, generation of a scale due to the binding of cation and anion is suppressed. Therefore, the decrease in the ability to generate electrolyzed water due to retention of the scale in cathode hole 1CTH is suppressed.

(4) Gaps C1, C2 are paths through which water flows from one end of cation exchange membrane 5 to the other end of cation exchange membrane 5.

According to this, at least one of retention of ozone between anode 1A and cation exchange membrane 5 and retention of hydrogen between cation exchange membrane 5 and cathode 1C is suppressed. As a result, the increase in the voltage applied between anode 1A and cathode 1C, which is necessary for generating electrolyzed water is suppressed.

(5) High electrical resistance material R may be a coating material applied to cathode hole 1CTH.

According to this, high electrical resistance material R easily adheres to cathode hole 1CTH.

(6) Electrolyzed water generators 100A, 100B include anode 1A, cation exchange membrane 5 provided in contact with anode 1A, cathode 1C provided in contact with cation exchange membrane 5 and having a frame shape, and high electrical resistance material R provided on an inner periphery of the frame shape so as to be in contact with an inner peripheral surface of the frame shape and having an electrical resistance value higher than the electrical resistance value of cathode 1C. Cation exchange membrane 5 is provided with membrane hole 5TH penetrating cation exchange membrane 5 so that the surface of anode 1A facing cation exchange membrane 5 is exposed. High electrical resistance material R is provided with communication hole RTH penetrating high electrical resistance material R such that high electrical resistance material R communicates with membrane hole 5TH.

According to this, the decrease in the ability to generate electrolyzed water due to retention of the scale in communication hole RTH is suppressed.

(7) Cathode 1C may contain a stainless steel material, and high electrical resistance material R may contain a fluorine resin material.

According to this, both the value of the adhesion strength between cathode 1C and the coating material and a required electrical resistance value are set to desired values.

(8) Electrolyzed water generation system 1000 includes electrolyzed water generators 100A, 100B according to any one of the above (1) to (7) and controllers CA, CB, CC, CD for controlling electrolyzed water generators 100A, 100B. Controllers CA, CB, CC, CD intermittently apply a voltage between anode 1A and cathode 1C.

According to this, while the application of the voltage between anode 1A and cathode 1C is stopped, ozone retained between anode 1A and cation exchange membrane 5 flows out into water supplied to electrolyzed water generators 100A, 100B. Thus, it is suppressed that ozone is retained between anode 1A and cation exchange membrane 5. While the application of the voltage between anode 1A and cathode 1C is stopped, hydrogen retained between cation exchange membrane 5 and cathode 1C flows out into water supplied to electrolyzed water generators 100A, 100B. Thus, it is suppressed that hydrogen is retained between cation exchange membrane 5 and cathode 1C.

(9) Electrolyzed water generation system 1000 may include flow paths (15, 10A, 10B) through which water is supplied to electrolyzed water generators 100A, 100B. Electrolyzed water generation system 1000 may include pump P that supplies water to flow paths (15, 10A, 10B) and flow path change mechanism V switched so as to intermittently supply water from flow paths (15, 10A, 10B) to electrolyzed water generators 100A, 100B. Controllers CA, CB, CC, CD control pump P and flow path change mechanism V. Consequently, water is supplied from flow paths (15, 10A, 10B) to electrolyzed water generators 100A, 100B even during the period in which no voltage is applied.

According to this, most of ozone retained between anode 1A and cation exchange membrane 5 and most of hydrogen retained between cation exchange membrane 5 and cathode 1C can be caused to flow from electrolyzed water generators 100A, 100B to downstream flow paths (20A, 20B).

(10) Electrolyzed water generation system 1000 includes trunk flow path 15 to which raw water is supplied, first branch flow paths 10A, 20A branched from trunk flow path 15, and second branch flow paths 10B, 20B branched from trunk flow path 15 and supplying the raw water, flowing through trunk flow path 15, to the downstream of trunk flow path 15.

Electrolyzed water generation system 1000 includes electrolyzed water generators 100A, 100B. Electrolyzed water generators 100A, 100B include anode 1A, cathode 1C, and cation exchange membrane 5 provided between anode 1A and cathode 1C. Electrolyzed water generators 100A, 100B are connected to first branch flow paths 10A, 20A and switched between the first generation state where first electrolyzed water is generated from raw water flowing through first branch flow paths 10A. 20A and the first non-generation state where the first electrolyzed water is not generated.

Flow path change mechanisms V, V1, V2 are switched between the first state where raw water is supplied from trunk flow path 15 to first branch flow paths 10A, 20A and the second state where the raw water is supplied from trunk flow path 15 to second branch flow paths 10B, 20B.

According to the above configuration, when no voltage is applied between anode 1A and cathode 1C, flow path change mechanisms V V1, V2 can be switched to the second state such that the raw water is not supplied to cation exchange membrane 5. This can suppress that cation exchange membrane 5 incorporates cations contained in the raw water. Thus, it is suppressed that when electrolyzed water generators 100A, 100B are generating electrolyzed water, that is, when a voltage is applied between anode 1A and cathode 1C, the cations incorporated into cation exchange membrane 5 are released into electrolyzed water. As a result, scale generation due to the release of cations from cation exchange membrane 5 to the electrolyzed water is suppressed. When electrolyzed water generators 100A, 100B are not generating electrolyzed water, water that is not electrolyzed water can be taken out from second branch flow path 10B. Therefore, when electrolyzed water generators 100A, 100B are not generating electrolyzed water, it is possible to use water that is not electrolyzed water while suppressing scale generation.

(11) Electrolyzed water generation system 1000 may further include controllers CA, CB, CC, CD that control electrolyzed water generators 100A, 100B. Controllers CA. CB, CC, CD intermittently apply a voltage between anode 1A and cathode 1C and thereby performs control to switch electrolyzed water generators 100A, 100B from the non-generation state to the generation state.

According to the above configuration, the electrolyzed water generator can generate electrolyzed water by switching to the generation state where electrolyzed water is generated.

(12) In electrolyzed water generation system 1000, anode 1A is first anode 1A. Cathode 1C is first cathode 1C. Cation exchange membrane 5 is first cation exchange membrane 5. The generation state is the first generation state. The non-generation state is the first non-generation state. Electrolyzed water generators 100A and 100B are first electrolyzed water generator 100A.

Electrolyzed water generation system 1000 includes second electrolyzed water generator 100B. Electrolyzed water generator 100B includes second anode 1A, second cathode 1C, and second cation exchange membrane 5 provided between second anode 1A and second cathode 1C. Second electrolyzed water generator 100B is connected to second branch flow paths 10B, 20B and switched between the second generation state where second electrolyzed water is generated from raw water flowing through second branch flow paths 10B, 20B and the second non-generation state where the second electrolyzed water is not generated.

When electrolyzed water generator 100A described above is continuously used, many ozone bubbles are retained between anode 1A and cation exchange membrane 5, and many hydrogen bubbles are retained between cathode 1C and cation exchange membrane 5. The retained ozone bubbles and hydrogen bubbles form a local insulating portion. Thus, the electrolysis ability of raw water decreases. That is, the voltage applied between anode 1A and cathode 1C increases. The scale adheres to cathode 1C due to an increase in the pH of water. As a result, the ability to generate electrolyzed water decreases. Thus, the time for continuously using each of first electrolyzed water generator 100A and second electrolyzed water generator 100B is shortened, or there is no alternative but to give up the continuous use of each of first electrolyzed water generator 100A and second electrolyzed water generator 100B. However, according to the above configuration, the electrolyzed water generator that generates electrolyzed water and the electrolyzed water generator that does not generate electrolyzed water are switched such that the period of use of each electrolyzed water generator is divided, so that the period of use of each of first electrolyzed water generator 100A and second electrolyzed water generator 100B is shortened. On the other hand, electrolyzed water is continuously generated. As a result, the ability to generate electrolyzed water is improved.

(13) Electrolyzed water generation system 1000 may further include first electrolyzed water generator 100A, second electrolyzed water generator 100B, and controllers CA, CB, CC, CD that control flow path change mechanism V. When controllers CA, CB, CC, CD perform control to switch flow path change mechanism V from the second state to the first state, controllers CA, CB, CC, CD perform control to switch first electrolyzed water generator 100A from the first non-generation state to the first generation state during a period where second electrolyzed water generator 100B is controlled to be switched from the second generation state to the second non-generation state and flow path change mechanism V is controlled to be switched from the second state to the first state. When controllers CA, CB, CC, CD perform control to switch flow path change mechanism V from the first state to the second state, controllers CA, CB, CC, CD perform control to switch second electrolyzed water generator 100B from the second non-generation state to the second generation state during a period in which first electrolyzed water generator 100A is controlled to be switched from the first generation state to the first non-generation state and flow path change mechanism V is controlled to be switched from the first state to the second state.

According to the above configuration, controllers CA, CB automatically suppress scale generation.

(14) Electrolyzed water generation system 1000 further includes purification device 200 that is connected to second branch flow paths 10B, 20B, generates purified water from raw water flowing through second branch flow paths 10B, 20B, and supplies the generated purified water to the downstream of second branch flow paths 10B, 20B.

According to this, when electrolyzed water generators 100A, 100B do not generate electrolyzed water, purified water can be used instead of raw water.

(15) Electrolyzed water generation system 1000 further includes purification device 200 that is connected to trunk flow path 15, generates purified water from raw water flowing through trunk flow path 15, and supplies the generated purified water to the downstream of trunk flow path 15.

In this case, electrolyzed water generators 100A, 100B generate electrolyzed water from purified water. According to this, since electrolyzed water is generated from purified water, the possibility of foreign matters entering the insides of electrolyzed water generators 100A, 100B is reduced. When electrolyzed water generators 100A, 100B do not generate electrolyzed water, purified water can be used instead of raw water.

(16) Flow path change mechanism V, V1, V2 have first open/close valve V1 connected to first branch flow paths 10A, 20A and second open/close valve V2 connected to second branch flow paths 10B, 20B. In the first state, first open/close valve V1 is opened, and second open/close valve V2 is closed. In the second state, first open/close valve V1 is closed, and second open/close valve V2 is opened.

According to the above configuration, when no voltage is applied between anode 1A and cathode 1C, the states of first open/close valve V1 and second open/close valve V2 can be switched such that raw water is not supplied to cation exchange membrane 5. This can suppress that cation exchange membrane 5 incorporates cations contained in the raw water. Thus, it is suppressed that when a voltage is applied between anode 1A and cathode 1C, the cations incorporated into cation exchange membrane 5 are released into electrolyzed water. As a result, scale generation due to the release of cations from cation exchange membrane 5 to the electrolyzed water is suppressed.

REFERENCE MARKS IN THE DRAWINGS

1A: anode (first anode, second anode, electrode)
1C: cathode (first cathode, second cathode, electrode)
1CTH: cathode hole
1S: power supply body
1SA, 15C: shaft attachment piece
5: cation exchange membrane
5TH: membrane hole
10A: upstream-side first branch flow path (flow path)
10B: upstream-side second branch flow path (flow path)
15: trunk flow path (flow path)
20A: downstream-side first branch flow path (flow path)
20B: downstream-side second branch flow path (flow path)
100A: first electrolyzed water generator (electrolyzed water generator)
100B: second electrolyzed water generator
101: housing
102: electrode case
103: electrode case lid
104, 105: through-hole
106, 107: power supply shaft
200: purification device
1000: electrolyzed water generation system
AC: AC power
C1, C2: gap (groove or cutout)
C, CA, CB, CC, CD: controller
I: input unit
M: memory
P: pump
PR: processor
r: resistor
R: high electrical resistance material
RTH: communication hole
S: sensor
V: flow path change mechanism
V1, V2: open/close valve (flow path change mechanism)

The invention claimed is:

1. An electrolyzed water generation system comprising:
an electrolyzed water generator comprising:
  an anode;
  a cathode; and
  a cation exchange membrane provided between the anode and the cathode and being in contact with at least one of the anode and the cathode, wherein a gap in which a flow of water occurs is present between the cation exchange membrane and the at least one of the anode and the cathode;
a controller that controls the electrolyzed water generator;
a flow path that supplies the water to the electrolyzed water generator;
a pump that supplies the water to the flow path; and
a flow path change mechanism that is switched to intermittently supply the water from the flow path to the electrolyzed water generator, wherein:
the controller intermittently applies a voltage between the anode and the cathode, and
during a period where the voltage is not applied, the controller causes the pump and the flow path change mechanism to supply the water from the flow path to the electrolyzed water generator.

2. An electrolyzed water generation system comprising:
a trunk flow path supplied with water;
a first branch flow path branched from the trunk flow path;
a first electrolyzed water generator that includes a first anode, a first cathode, and a first cation exchange membrane provided between the first anode and the first cathode, the first electrolyzed water generator being connected to the first branch flow path, and switched between a generation state where electrolyzed water is generated from the water flowing through the first branch flow path and a non-generation state where the electrolyzed water is not generated;
a second branch flow path that is branched from the trunk flow path and supplies the water, flowing through the trunk flow path, to a downstream of the trunk flow path;
a flow path change mechanism that is switched between a first state where the water is supplied from the trunk flow path to the first branch flow path and a second state where the water is supplied from the trunk flow path to the second branch flow path; and
a controller that intermittently applies a voltage between the anode and the cathode, wherein:
the flow path change mechanism is configured to intermittently supply the water from the trunk flow path to the first electrolyzed water generator, and
during a period where the voltage is not applied, the controller causes the flow path change mechanism to supply the water from the trunk flow path to the first electrolyzed water generator.

3. The electrolyzed water generation system according to claim 2, further comprising a second electrolyzed water generator including a second anode, a second cathode, and a second cation exchange membrane provided between the second anode and the second cathode, the second electrolyzed water generator being connected to the second branch flow path, and switched between a generation state where second electrolyzed water is generated from the water flowing through the second branch flow path and a non-generation state where the second electrolyzed water is not generated.

4. The electrolyzed water generation system according to claim 3,
wherein when the controller performs control to switch the flow path change mechanism from the second state to the first state, the controller performs control to switch the first electrolyzed water generator from the non-generation state to the generation state during a period where the second electrolyzed water generator is controlled to be switched from the generation state to the non-generation state and the flow path change mechanism is controlled to be switched from the second state to the first state, and
when the controller performs control to switch the flow path change mechanism from the first state to the second state, the controller performs control to switch the second electrolyzed water generator from the non-generation state to the generation state during a period where the first electrolyzed water generator is controlled to be switched from the generation state to the non-generation state and the flow path change mechanism is controlled to be switched from the first state to the second state.

5. The electrolyzed water generation system according to claim 2, further comprising a purification device that is connected to the second branch flow path, generates purified water from the water flowing through the second branch flow path, and supplies the generated purified water to a downstream of the second branch flow path.

6. The electrolyzed water generation system according to claim 2, further comprising a purification device that is connected to the trunk flow path, generates purified water from the water flowing through the trunk flow path, and supplies the generated purified water to the downstream of the trunk flow path, wherein the first electrolyzed water generator uses the purified water as the water and generates the electrolyzed water from the purified water.

7. The electrolyzed water generation system according to claim 2, wherein
the flow path change mechanism has a first valve connected to the first branch flow path and a second valve connected to the second branch flow path,
in the first state, the first valve is opened, and the second valve is closed, and
in the second state, the first valve is closed, and the second valve is opened.

8. An electrolyzed water generation system, comprising:
an electrolyzed water generator including: an anode; a cathode; and a cation exchange membrane provided between the anode and the cathode, being in contact with at least one of the anode and the cathode, and
a controller that controls the electrolyzed water generator, wherein the controller intermittently applies a voltage between the anode and the cathode while water continuously flows the electrolyzed water generator.

9. An electrolyzed water generator comprising:
an anode;
a cathode; and
a cation exchange membrane provided between the anode and the cathode, having a first surface facing the cathode and a second surface facing the anode, and being in contact with at least one of the anode and the cathode, wherein:
the cation exchange membrane comprises:
a gap in which a flow of water occurs is present between the cation exchange membrane and the at least one of the anode and the cathode which is in contact with the cation exchange membrane; and
a plurality of membrane holes penetrating the cation exchange membrane to expose an upper surface of the anode facing the cation exchange membrane, each of the plurality of membrane holes being surrounded by a cation exchange membrane material constituting the cation exchange membrane,
the gap communicates with the plurality of membrane holes, and
the gap is formed in at least one of the first surface of the cation exchange membrane, which is contact with the cathode, and the second surface of the cation exchange membrane, which is contact with the anode.

10. The electrolyzed water generator according to claim 9, wherein the gap is a groove or a cutout.

* * * * *